United States Patent [19]
Vlannes

[11] Patent Number: 5,404,144
[45] Date of Patent: Apr. 4, 1995

[54] SIMULTANEOUS DETERMINATION OF INCOMING MICROWAVE FREQUENCY AND ANGLE-OF-ARRIVAL

[75] Inventor: Nickolas P. Vlannes, Fairfax, Va.

[73] Assignee: The United States of America as represented by the Secretary of the Navy, Washington, D.C.

[21] Appl. No.: 245,284

[22] Filed: May 4, 1994

[51] Int. Cl.6 ............................................. G01S 5/02
[52] U.S. Cl. ....................................... 342/13; 342/424
[58] Field of Search .................. 342/13, 192, 193, 424

[56] References Cited

U.S. PATENT DOCUMENTS

| | | | |
|---|---|---|---|
| 4,634,230 | 1/1987 | Spezio | 342/54 X |
| 4,649,392 | 3/1987 | Apostolos | 342/192 |
| 4,801,941 | 1/1989 | Sabet-Peymar | 342/378 |
| 4,802,149 | 1/1989 | Moore | 367/100 |
| 4,909,627 | 3/1990 | Brousseau | 356/346 |
| 5,327,142 | 7/1994 | Tsui et al. | 342/192 |

*Primary Examiner*—Mark Hellner
*Attorney, Agent, or Firm*—Jacob Shuster

[57] ABSTRACT

Incoming signals radiated to an array of antennas are processed within a signal surveillance system by adding signal outputs of two antennas at a common frequency. Separation of the added signal outputs according to frequency and comparison of power level measurement thereof provides signal phase difference data from which frequency and direction of the incoming signals are simultaneously determined.

9 Claims, 11 Drawing Sheets

SIMULTANEOUS DETERMINATION OF INCOMING MICROWAVE FREQUENCY AND ANGLE-OF-ARRIVAL

BACKGROUND OF THE INVENTION

This invention relates to apparatus and method for sensing and processing incoming electromagnetic radiation signals to simultaneously determine frequency and directional angle-of-arrival of such signals at an antenna array for various surveillance purposes.

Various techniques have previously been employed for determination of frequency and angles-of-arrival of a microwave signal through use of electronic circuits. One known method of calculating the angle-of-arrival of a microwave signal is to sense such signal with two coplanar antennas. The phase-difference between antenna receptions is dependent on the angles-of-arrival and frequency of the incoming microwave signal. Thus, with knowledge of such phase-difference and the signal frequency, the angles-of-arrival can be calculated. Currently known electronic methods determine this phase-difference and frequency by using channelized receivers which require multiple phase-matched channelizer banks with phase comparison circuitry at the outputs of the channel filters. Such techniques require a large volume of electronic circuitry, with accompanying power requirements and weight problems.

An alternative approach to the foregoing signal sensing techniques reside in the use of acousto-optic devices which require at least one acousto-optic cell per antenna with the deflected light from each acoustic-optic cell combined by optical interferometry. Each cell is driven with a signal from a different antenna and the output of each cell reflects the characteristics of the signal of the respective antenna. Frequency is determined by the angle of the deflection of the light emerging from the acousto-optic cells, and the phase of the light from each cell contains data on the angle of arrival of the microwave signal. In order to extract such data from the phase information of the deflected light from each cell, the light is combined interferometrically. The interferometric recombination involved may be accomplished by arranging the two acousto-optic cells in separate arms of an interferometer, such as a Mach-Zehnder interferometer, or by arranging the acousto-optic cells as elements of a diffraction array. The disadvantage of the foregoing acousto-optic cells approach is the redundancy of using two cells if one will suffice In the case of the use of a diffraction array, a difficulty arises in keeping track of a complicated light diffraction pattern as the phase of acoustic signals change with the variation in phase of the microwave signals that drive the respective cells.

U.S. Pat. No. 4,503,388 to Zehl et al. illustrates, for example, an arrangement of a type commonly used for determining frequency of incoming RF signals by passing laser light through a Bragg cell for diffraction in response to a RF signal stimulating the cell. Another spectrum analyzer system is shown in U.S. Pat. No. No. 4,636,718. According to U.S. Pat. No. 4,644,267 to Tsin et al., an arrangement is disclosed for measuring the angle of arrival of a signal on a two quadrant antenna which receives the signal with a phase difference. A signal frequency measuring receiver is therefore employed for cueing the frequency of the phase comparison unit.

It is therefore an important object of the present invention is to provide a more efficient microwave signal processing apparatus and method that simultaneously determines frequency and directional angle-of-arrival of incoming electromagnetic signals impinging on an antenna array.

It is a further object of the invention to more efficiently determine angles-of-arrival and frequency of active radar signals.

It is yet another object of the invention to passively sense signals for characterization and identification of communication systems or radar systems.

SUMMARY OF THE INVENTION

In accordance with the present invention, the phase relation between antenna pairs of an array of at least three antennas are determined by power or energy measurements to obtain angles-of-arrival readouts. The objectives of the invention are achieved by a system which employs electronic microwave interferometry, frequency selecting devices, and square-law detection for processing of the incoming electromagnetic signals. Such electronic signal processing includes by the summing of the signals from antenna pairs. The summed signals contain phase-difference information due to the direction of the microwave signals impinging on the antenna array, and retain the frequency content of each impinging signal. The summed signal is then processed through signal separation devices that divide the signal into its microwave frequency content. Thereafter, square-law detectors sense the signals emanating from the signal frequency-separator so as to enable determination of the direction of the electromagnetic signals impinging on the antenna array, since the amplitude of each signal from the square-law detector is related to the phase difference of the electromagnetic signals arriving at the antenna pairs which in turn relates to the position of the antenna pair in the array, the signal frequency and its directional angle-of-arrival. Analysis of the frequency and propagational direction of the antenna signals involves a comparison of signals from antenna pairs and use of microwave interferometry to obtain phase difference information by electromagnetic power measurements.

In regard to measuring angles-of-arrival, the directional information is contained in the phase-difference between two antenna signals. Microwave interferometry aforementioned is applied by adding together the two antenna signals and making a power measurement on the summed signal through a microwave summer. The frequency of the signal impinging on the antennas is also determined using frequency selecting devices of the frequency separator that divide the summed microwave signal into its fundamental and component microwave frequencies. Such devices filter microwave signals by frequency, based on material wave-type technologies that operate at microwave frequency involving wave propagation of a material property, rather than the movement of electrons as conduction. The material waves are launched by transducers that convert a driving microwave signal into the material-wave signal which retains the frequency and phase information of the driving microwave signal. Because of phase information retention, the magnitude of the signals sensed by square-law detectors are used to specify the phase-difference of the summed signals of antenna pairs.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein.

Figure 15:
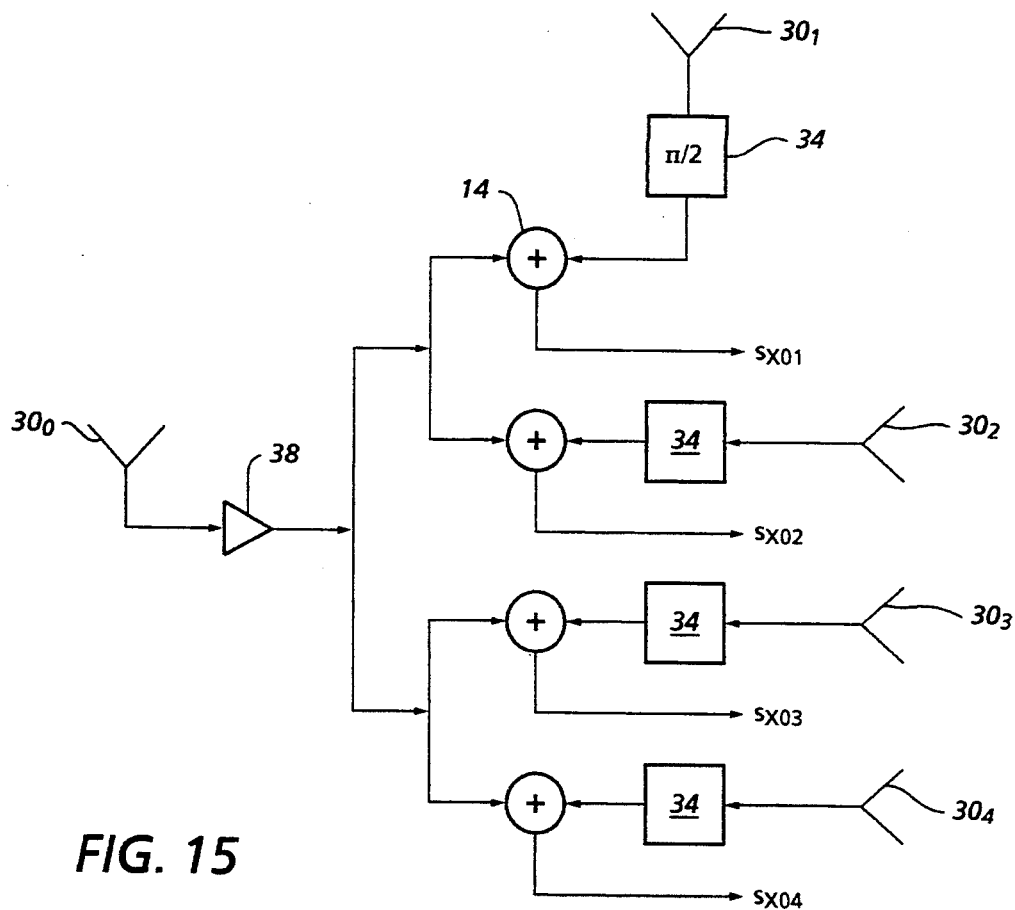
Figure 16:
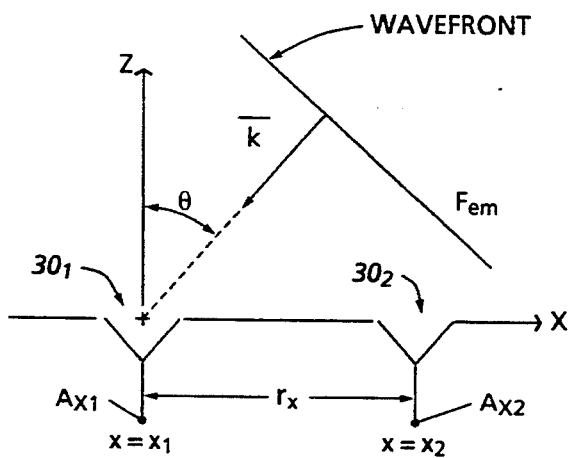
Figure 17A:
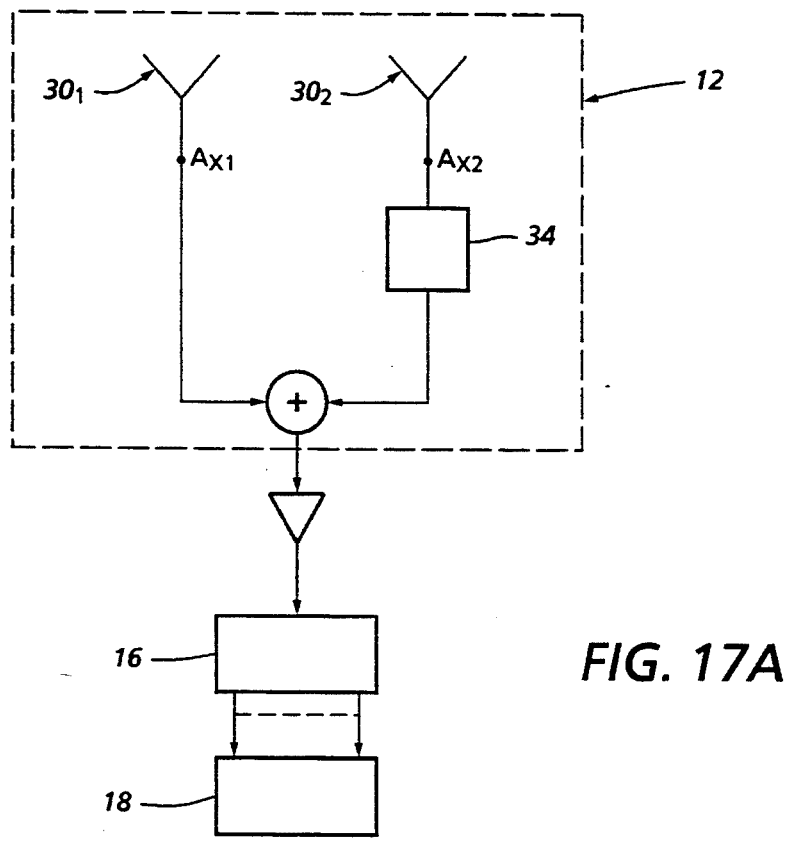
Figure 17B:
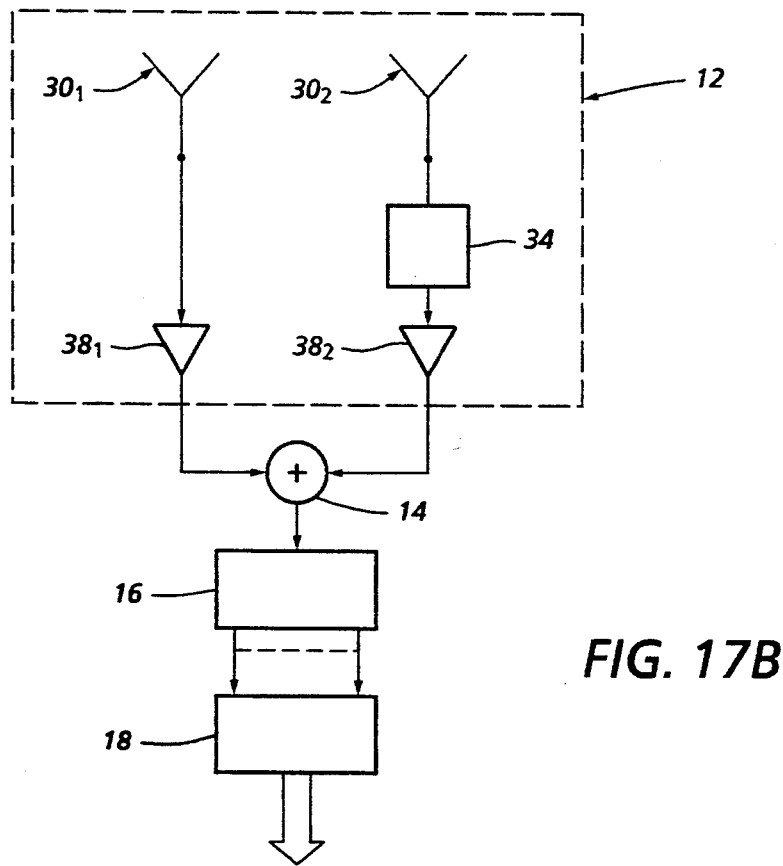

FIG. 15 presents a schematic diagram of the signal processing for the five antenna arrays of two orthogonal sets of collinear antennas of FIG. 10;

FIG. 16 is a diagram illustrating of one set two collinear antennas associated with the antenna arrays of FIG. 11; and, FIG. 17A and FIG. 17B show two different embodiments of the signal processing for the two collinear antenna system of FIG. 11.

DETAILED DESCRIPTION OF PREFERRED EMBODIMENT

Figure 1:
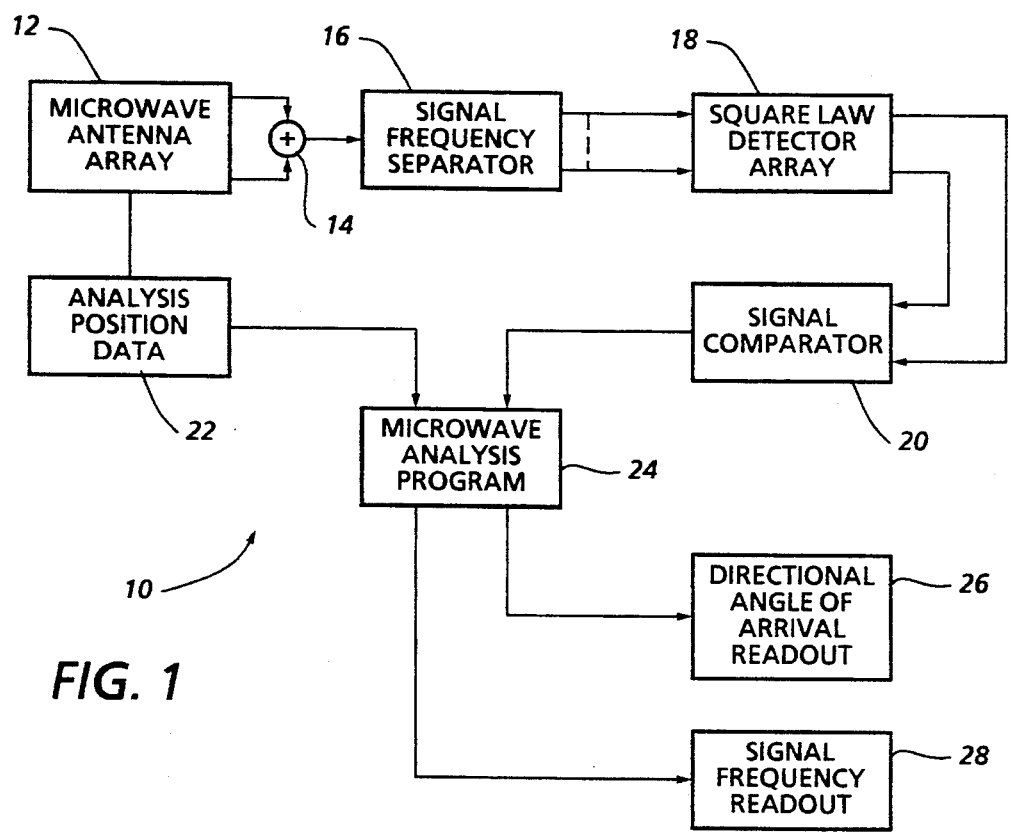
FIG. 1 is a block diagram illustrating a microwave signal surveillance system within which the present invention is embodied.

Referring now to the drawing in detail, FIG. 1 diagrams a signal surveillance system 10 of the microwave interferometer type through which electromagnetic frequency and direction-of-arrival of incoming microwave signals, impinging on an array 12 of antenna pairs, are simultaneously determined. The incoming signals originate for example from a remotely located radiation source such as radar, communications or sensing equipment. Initially, the received signals from each pair of antennas are added by a summer 14 as diagrammed in FIG. 1. The summed signal output of summer 14, which contains information on the signal phase difference between the antennas of each pair due to the direction of the incoming microwave signal, is then processed through a signal frequency separator 16. The microwave frequency content of the incoming signal, retained in the summer output, is divided by the separator 16 into fundamental and component frequencies.

The frequency dividing and signal filtering function of separator 16 is performed within the microwave frequency range according to one embodiment of the invention by devices well known in the material wave-type technology field, based on wave propagation of a material property. The material wave phenomena involved includes for example the launching of sound and magnetic waves by transducers that convert the driving microwave signal from the summer 14 into material-wave signal outputs from the separator 16 by devices of the acoustic-optic or magneto-optic type according to certain embodiments of the invention. According to other embodiments, the separator 16 may utilize surface-acoustic, bulk-acoustic or microwave magnetostatic wave type devices, or acoustic-charge-transport types of devices. Such frequency selective devices are either based directly on the wave phenomena or use the waves to modulate light in order to determine microwave signal frequency.

The divided output wave signals from the separator 16 are sensed by square law detectors 18, as diagrammed in FIG. 1, to provide power amplitude measurements compared by a signal comparator component 20 for determination of the angles-of-arrival from the phase difference between the summed signals of each antenna pair based on the frequency and phase information retained therein. The outputs of the signal comparator 20 are analyzed in conjunction with the frequency content thereof and the antenna position data 22 of the array 12 by a microwave signal measurement analysis process 24, as diagrammed in FIG. 1, to provide a directional angle-of-arrival readout 26 and a signal frequency readout 28.

Figure 2:
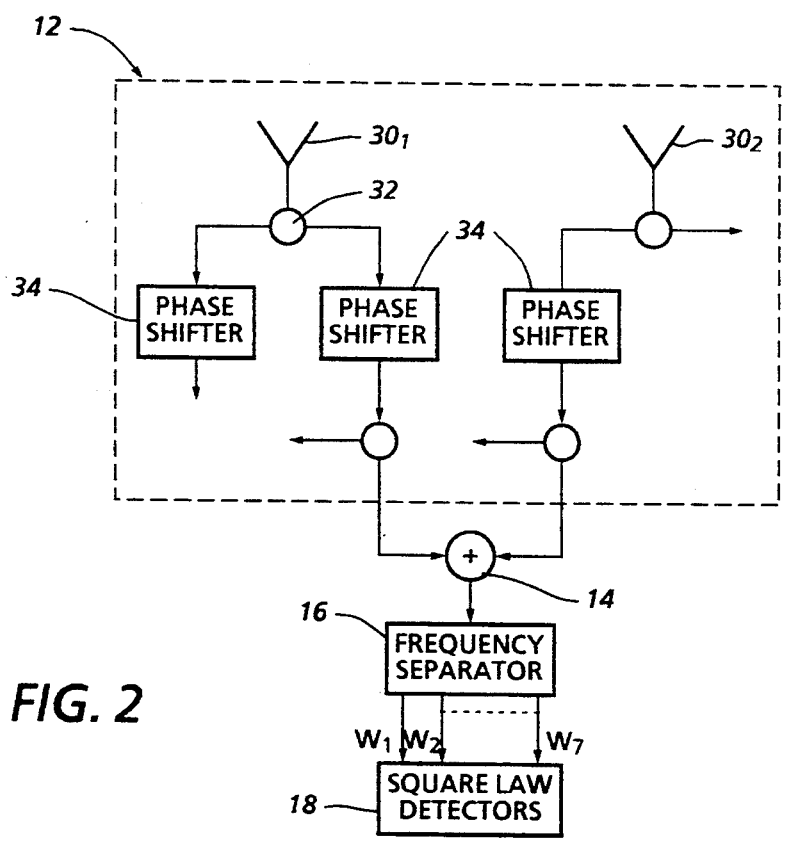
FIG. 2 is a schematic diagram of portion of the system diagrammed in FIG. 1, including a portion of the antenna array.

FIG. 2 diagrams a portion of the antenna array 12 of FIG. 1 formed by a pair of antennas 301 and 302. Each antenna is connected through a signal divider 32 and a phase shifter 34 to the summer 14. Two divided, phase-shifted antenna signals are accordingly summed and fed by the summer 14 to frequency separator 16 in the form of an electronic device having a plurality of terminals from which outputs of different frequencies $\omega_1, \omega_2 \ldots \omega_7$ are directed to square law detectors 18.

Figure 3B:
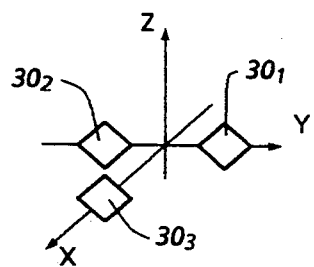
FIG. 3B is a three dimensional three antenna arrangement in an antenna array associated with the present invention.
Figure 3A:
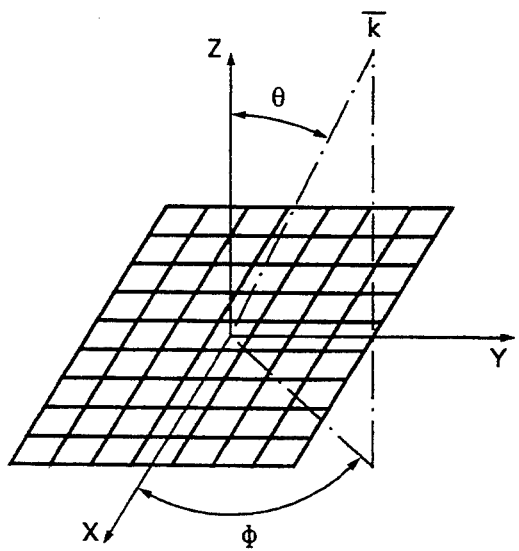
FIG. 3A is a three dimensional coordinate diagram associated with the antenna arrays associated with the present invention.

FIG. 3 illustrates a three dimensional Cartesian coordinate system for the antenna array 12 having a polar angle $\theta$ and an azimuth angle $\phi$. The antenna array 12 is located in the x-y plane of the coordinate system diagrammed in FIG. 3A. The electromagnetic field ($F_{em}$)

of an incoming electromagnetic wave is characterized by the field relation:

$$F_{em} = f_{em} \cos(\omega t - \vec{k} \cdot \vec{r} + \Psi) \tag{1}$$

where $\vec{r}$ is the position vector in the Cartesian coordinate system, $f_{em}$ is the magnitude of the field, $\omega$ is the radial microwave frequency, $\vec{k}$ is the propagation vector, and $\Psi$ is an arbitrary phase term. The propagation vector of the microwave signal, $\vec{k}$ of the electromagnetic wave of a radar or communication signal can be expressed in this coordinate system through the Cartesian coordinates and the spherical coordinate angles:

$$\vec{k} = k_x \hat{x} + k_y \hat{y} + k_z \hat{z} \tag{2}$$

$$\vec{k} = -k \sin(\theta)\cos(\Phi)\hat{x} + -k\sin(\Phi)\hat{y} + -k\cos(\theta)\hat{z} \tag{3}$$

where the magnitude of the propagation vector ($|k| = k$) is $k = \omega/c$, and c is the speed of light. The minus signs in front of each component of the propagation vector of equation(3) is due to the orientation of $\vec{k}$ in terms of the antenna array 12 and coordinate system. The angles, $\theta$ and $\phi$, of the spherical coordinate system are the arrival angles needed to specify the direction from which the electromagnetic wave is propagating.

A minimum of three noncollinear antennas 30 in a triangular pattern as depicted in FIG. 3B are required to fully determine the angles-of-arrival, $\phi$ and $\theta$, for a microwave signal propagating from an arbitrary direction and impinging on an antenna array 12. These three antennas may be the complete antenna array according to the embodiment of FIG. 3B or part of a larger antenna array. The distance between the antennas, the angles of the triangle, and orientation of the triangle are in general arbitrary. In FIG. 3B, antenna $30_1$, is located at Cartesian coordinates $x = x_1$, $y = y_1$, $z = 0$; antenna $30_2$ is located at $x = x_2$, $y = y_2$, $z = 0$; and antenna $30_3$ is located at $x = x_3$, $y = y_3$, $z = 0$. Antenna $30_1$ generates signal $A_1$; antenna $30_2$ generates signal $A_2$; and antenna $30_3$ generates signal $A_3$. Such signals are proportional to the microwave field ($F_{em}$) at the location of the antenna:

$$A_1 \propto F_{em}(x = x_1, y = y_1, z = 0) \propto f_{em} \cos\left[\omega t + \frac{\omega}{c}\sin(\theta)[x_1\cos(\phi) + y_1\sin(\phi)] + \Psi\right] \tag{4}$$

$$A_2 \propto F_{em}(x = x_2, y = y_2, z = 0) \propto f_{em} \cos\left[\omega t + \frac{\omega}{c}\sin(\theta)[x_2\cos(\phi) + y_2\sin(\phi)] + \Psi\right] \tag{5}$$

$$A_3 \propto F_{em}(x = x_3, y = y_3, z = 0) \propto f_{em} \cos\left[\omega t + \frac{\omega}{c}\sin(\theta)[x_3\cos(\phi) + y_3\sin(\phi)] + \Psi\right] \tag{6}$$

As shown in FIG. 2, each antenna signal is divided by a signal divider 32. Either prior to the division or after dividing, a phase is added to each resultant signal with a phase-shifter 34. Where three antenna signals $A_1$, $A_2$, and $A_3$ are involved, there are six phase shifted signals represented as:

$$A_{\phi 1} = \tag{7}$$

$$a_{\phi 1}\cos\left[\omega t + \frac{\omega}{c}\sin(\theta)[x_1\cos(\phi) + y_1\sin(\phi)] + \Psi_{\phi 1} + \phi_1\right]$$

$$A_{\zeta 1} = \tag{8}$$

$$a_{\zeta 1}\cos\left[\omega t + \frac{\omega}{c}\sin(\theta)[x_1\cos(\phi) + y_1\sin(\phi)] + \Psi_{\zeta 1} + \zeta_1\right]$$

$$A_{\phi 2} = \tag{9}$$

$$a_{\phi 2}\cos\left[\omega t + \frac{\omega}{c}\sin(\theta)[x_1\cos(\phi) + y_1\sin(\phi)] + \Psi_{\phi 2} + \phi_2\right]$$

$$A_{\zeta 2} = \tag{10}$$

$$a_{\zeta 2}\cos\left[\omega t + \frac{\omega}{c}\sin(\theta)[x_1\cos(\phi) + y_1\sin(\phi)] + \Psi_{\zeta 2} + \zeta_2\right]$$

$$A_{\phi 3} = \tag{11}$$

$$a_{\phi 3}\cos\left[\omega t + \frac{\omega}{c}\sin(\theta)[x_1\cos(\phi) + y_1\sin(\phi)] + \Psi_{\phi 3} + \phi_3\right]$$

$$A_{\zeta 3} = \tag{12}$$

$$a_{\zeta 3}\cos\left[\omega t + \frac{\omega}{c}\sin(\theta)[x_1\cos(\phi) + y_1\sin(\phi)] + \Psi_{\zeta 3} + \zeta_3\right]$$

where the terms $\phi_i$ and $\zeta_i$ are the phases inserted by the phase-shifters, and the terms $\Psi$ are phases associated with the propagation of the signals through the electronics.

Figure 4:
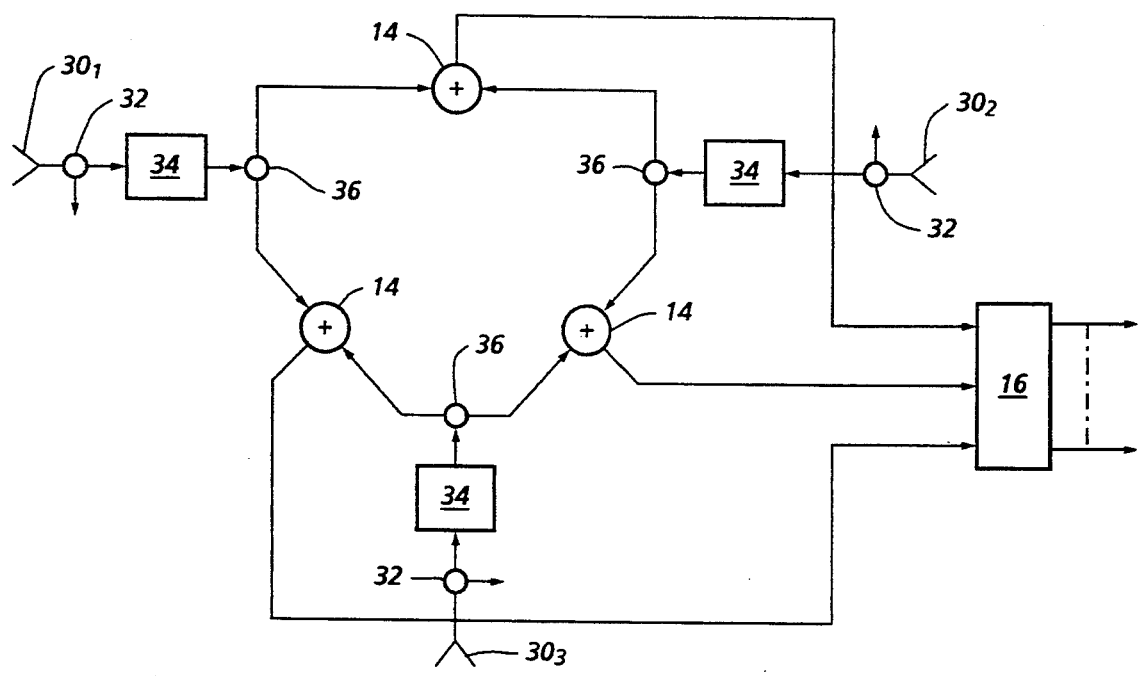
FIGS. 4 and 5 are schematic diagrams showing different electronic arrangements associated with a signal surveillance system in accordance with the present invention.

The electronic microwave interferometry arrangement diagrammed in FIG. 4 is used to add together pairs of the six signals to generate six sum-signals that are electronically processed to determine angles-of-arrival and frequency. All of the sum-signals are at the same electromagnetic frequency as the original signal impinging on the antennas. It is not imperative that the signals from the antennas be divided equally, as long as the splitting ratios are known. The six sum-signals are:

$$C_{12} = {}_{12}{}^{(1)}A_{\phi 1} + {}_{12}{}^{(2)}A_{\phi 2}$$

$$C_{13} = {}_{13}{}^{(1)}A_{\phi 1} + {}_{13}{}^{(2)}A_{\phi 3}$$

$$C_{23} = {}_{23}{}^{(2)}A_{\phi 2} + {}_{23}{}^{(3)}A_{\phi 3} \tag{13}$$

$$S_{12} = \sigma_{12}{}^{(1)}A_{\zeta 1} + \sigma_{12}{}^{(2)}A_{\zeta 2}$$

$$S_{13} = \sigma_{13}{}^{(1)}A_{\zeta 1} + \sigma_{13}{}^{(3)}A_{\zeta 3}$$

$$S_{23} = \sigma_{23}{}^{(2)}A_{\zeta 2} + \sigma_{23}{}^{(3)}A_{\zeta 3} \tag{14}$$

and are electronic microwave-interferometry signal combinations. The $C_{ij}$ and $\sigma_{ij}$ terms above are proportionality relations for each of the antenna signals in their contribution to the respective sum-signal $C_{ij}$ and $S_{ij}$ and distinguished by the superscript in the parenthesis of the terms $ij$ and $\sigma_{ij}$. Each sum-signal is then routed to its own frequency selection and square-law detection system.

By way of example, generation of the sum signal $S_{12}$ is explained. The electronic signals derived from two antennas $30_1$ and $30_2$ are respectively inserted into the system, as diagrammed in FIGS. 1, 2 and 4. After leaving phase-shifters 34 following the signal dividers $32_1$ and $32_2$, the signals are added together by the summer 14. The output from the summer is $S_{12}$, and is represented by:

$$S_{12} = \qquad (15)$$

$$S_{12}^{(1)}\cos\left(\omega t + \frac{\omega}{c}\sin(\theta)[x_1\cos(\phi) + y_1\sin(\phi)] + \beta_{s12}^{(1)} + \zeta_1\right) +$$

$$S_{12}^{(2)}\cos\left(\omega t + \frac{\omega}{c}\sin(\theta)[x_2\cos(\phi) + y_2\sin(\phi)] + \beta_{s12}^{(1)} + \zeta_2\right)$$

where $S_{s12}^{(1)}$ and $S_{s12}^{(2)}$ are amplitude terms, and $\beta_{s12}^{(1)}$ and $\beta_{s12}^{(2)}$ are again phase terms associated with the signal propagation of $A_{\zeta1}$ and $A_{\zeta2}$, respectively, that contribute to the sum-signal $S_{12}$. The sum-signal $S_{12}$ then enters the microwave frequency selective device 16, and depending on the microwave frequency of the signal ($\omega$ in FIG. 2), $S_{12}$ is directed to a specific one of the square-law detector 18. Knowing that a specific square-law detector has detected $S_{12}$ determines the frequency.

The output from a square-law detector, $I_{sij}$, is proportional to the time-average of the square of $S_{ij}$:

$$I_{sij} \propto \langle S_{ij}^2 \rangle \qquad (16)$$

For sum-signal $S_{12}$, the output from the square-law detector, $I_{s12}$, has the proportionality relation:

$$I_{s12} \propto a_{s12} + b_{s12}\cos\left(\frac{\omega}{c}\sin(\theta)[(x_1 - x_2)\cos(\phi) + (y_1 - y_2)\sin(\phi)] + \beta_{s12}^{(1)} - \beta_{s12}^{(2)} + \zeta_1 - \zeta_2\right) \qquad (17)$$

Thus the output from the square-law detector is dependent on the microwave frequency ($\omega$), and the angles-of-arrival ($\theta,\phi$). The remainder of the terms such as $a_{s12}$ and $b_{s12}$, and the phase propagation terms $\beta_{s12}^{(1)}$ and $\beta_{s12}^{(2)}$ are known for the specific electronic system that is used. Sum-signals $S_{13}$ and $S_{23}$ derived from other antenna pairs are processed in a similar manner to yield square-law detector outputs of $I_{s13}$ and $I_{s23}$, respectively. $I_{s13}$ and $I_{s23}$ are given by:

$$I_{s13} \propto a_{s13} + b_{s23}\cos\left(\frac{\omega}{c}\sin(\theta)[(x_1 - x_3)\cos(\phi) + (y_1 - y_3)\sin(\phi)] + \beta_{s13}^{(1)} - \beta_{s13}^{(3)} + \zeta_1 - \zeta_3\right) \qquad (18)$$

$$I_{s23} \propto a_{s23} + b_{s23}\cos\left(\frac{\omega}{c}\sin(\theta)[(x_2 - x_3)\cos(\phi) + (y_2 - y_3)\sin(\phi)] + \beta_{s23}^{(2)} - \beta_{s23}^{(3)} + \zeta_2 - \zeta_3\right) \qquad (19)$$

Comparable electronic processing is done with the $A_{\phi i}$'s to yield three similar measurement for $C_{12}$, $C_{13}$, and $C_{23}$ to give:

$$I_{c12} \propto a_{c12} + b_{c12}\cos\left(\frac{\omega}{c}\sin(\theta)[(x_1 - x_2)\cos(\phi) + (y_1 - y_2)\sin(\phi)] + \delta_{c12}^{(1)} - \delta_{c12}^{(2)} + \phi_1 - \phi_2\right) \qquad (20)$$

$$I_{c13} \propto a_{c13} + b_{c13}\cos\left(\frac{\omega}{c}\sin(\theta)[(x_1 - x_3)\cos(\phi) + (y_1 - y_3)\sin(\phi)] + \delta_{c13}^{(1)} - \delta_{c13}^{(3)} + \phi_1 - \phi_3\right) \qquad (21)$$

$$I_{c23} \propto a_{c23} + b_{c23}\cos\left(\frac{\omega}{c}\sin(\theta)[(x_2 - x_3)\cos(\phi) + (y_2 - y_3)\sin(\phi)] + \delta_{c23}^{(2)} - \delta_{c23}^{(3)} + \phi_2 - \phi_3\right) \qquad (22)$$

wherein the terms $\gamma$ are phase similar to the terms $\delta$ of the previous equations.

The latter six equations (16–22) contain cosine terms with the three arguments:

$$\sin(\theta)[(x_1-x_2)\cos(\Phi)+(y_1-y_2)\sin(\Phi)] = \rho_{12}$$

$$\sin(\theta)[(x_1-x_3)\cos(\Phi)+(y_1-y_3)\sin(\Phi)] = \rho_{13}$$

$$\sin(\theta)[(x_2-x_3)\cos(\Phi)+(y_2-y_3)\sin(\Phi)] = \rho_{23} \qquad (23)$$

The latter three expressions contain three unknowns, $\sin(\phi)$, $\cos(\phi)$, and $\sin(\theta)$. Both trigonometric functions, $\sin(\phi)$ and $\cos(\phi)$, are required to unambiguously determine the azimuth-angle, $\phi$, in the x-y plane of the antenna Cartesian coordinate system. The polar-angle, $\theta$, is uniquely determined from $\sin(\theta)$. Thus, the angles-of-arrival, $\phi$ and $\theta$, can then be found from the determined values of the trigonometric functions. The three expressions (23) above can be determined from the measurements of the I's and the known quantities; however, such expressions cannot be determined uniquely from a cosine function alone when there is no a priori information as to which phase-quadrant the value of the cosine term may be in. In order to uniquely determine the phase-quadrant, the sine of the same argument must also be known. This can be accomplished by introducing a $+\pi/2$ or $-\pi/2$ phase difference between the cosine terms with the same $\rho_{ij}$ arguments, that is by introducing a $\pm\pi/2$ phase difference between the square law detector outputs $I_{cij}$ and $I_{sij}$. The phase difference is controlled by the phase-terms $\phi_i$ and $\zeta_i$ via the phase-shifters 34. For this discussion, the $I_{sij}$ are changed to sine terms, and the expressions for $I_{cij}$ and $I_{sij}$ become:

$$I_{c12} \propto a_{c12} + \tag{24}$$

$$b_{c12}\cos\left(\frac{\omega}{c}\sin(\theta)[(x_1 - x_2)\cos(\phi) + (y_1 - y_2)\sin(\phi)] + \eta_{12}\right)$$

$$I_{c13} \propto a_{c13} + \tag{25}$$

$$b_{c13}\cos\left(\frac{\omega}{c}\sin(\theta)[(x_1 - x_3)\cos(\phi) + (y_1 - y_3)\sin(\phi)] + \eta_{13}\right)$$

$$I_{c23} \propto a_{c23} + \tag{26}$$

$$b_{c23}\cos\left(\frac{\omega}{c}\sin(\theta)[(x_2 - x_3)\cos(\phi) + (y_2 - y_3)\sin(\phi)] + \eta_{23}\right)$$

$$I_{s12} \propto a_{s12} + \tag{27}$$

$$b_{s12}\cos\left(\frac{\omega}{c}\sin(\theta)[(x_1 - x_2)\cos(\phi) + (y_1 - y_2)\sin(\phi)] + \eta_{12}\right)$$

$$I_{s13} \propto a_{s13} + \tag{28}$$

$$b_{s13}\cos\left(\frac{\omega}{c}\sin(\theta)[(x_1 - x_3)\cos(\phi) + (y_1 - y_3)\sin(\phi)] + \eta_{13}\right)$$

$$I_{s23} \propto a_{s23} + \tag{29}$$

$$b_{s23}\cos\left(\frac{\omega}{c}\sin(\theta)[(x_2 - x_3)\cos(\phi) + (y_2 - y_3)\sin(\phi)] + \eta_{23}\right)$$

Notice that each $I_{cij}$ and $I_{sij}$ pair has the same phase term $\eta_{ij}$. These six expressions (24–29) can be solved for the polar and azimuth angles by standard electronic computational methods or from look-up tables.

Each sum-signal is processed identically by a selector device in the frequency separator 16 as shown in FIG. 2 so that no phase or amplitude variations are introduced that are not the same for each sum-signal. As a result, a redundancy is provided in determining the frequency of the electromagnetic signal which provides a check on each frequency measurement.

Figure 5:
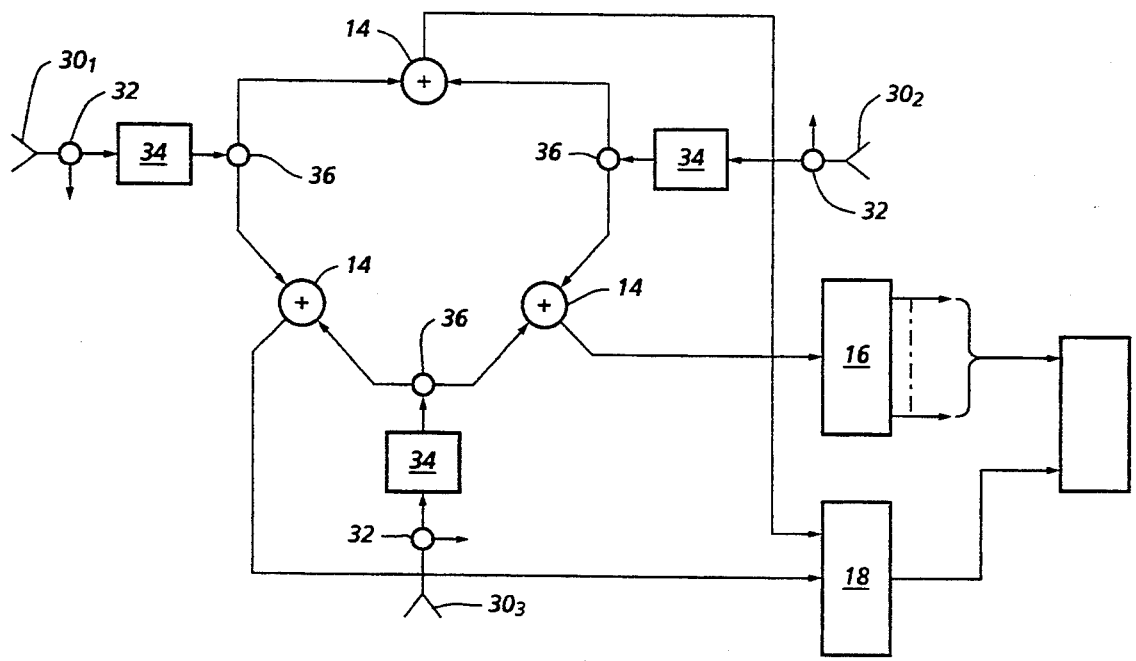

Another embodiment of the invention is shown in FIG. 5 wherein only one sum-signal ($S_{13}$) derived from a pair of antennas is processed through a frequency separator 16 while the other sum-signals are detected as outputs of their respective summers 14. According to this embodiment, the amplitude and/or phase of the sum-signals that are not used for frequency determination are modified identically to that of the sum-signal propagating through the frequency separator 16. Also, the phase and amplitude changes for each sum-signal is known by the time the sum-signal reaches its respective square-law detector 18. It does not make any difference which of the sum-signals is processed through the frequency separator 16. Alternatively, two sum-signals may be processed through the frequency separator 16 while the third is directly detected by a square-law detector 18. A further embodiment of the invention does not use the sum-signals to determine frequency, in which case the frequency of the electromagnetic wave is found by means other than the use of the sum-signals, and each sum-signal is detected following its respective summer. In this case, frequency and angles-of-arrival determination may not be simultaneous. Regardless of the use of a frequency selection system for each $S_{ij}$ or $C_{ij}$, the sum-signal from each summer has the same functional relations between each $S_{ij}$ and $C_{ij}$ and its respective $I_{ij}$ as discussed previously. However, the constants of proportionality for each $S_{ij}$ and $C_{ij}$ and its respective $I_{ij}$, as contain in the $a_{ij}$ and $b_{ij}$, may not be identical to those of the other sum-signal terms. In general, if the signal processing for each of the sum-signals are not identical, then differences need to be known a priori so that the calculations to determine the angles-of-arrival can compensate for the differences, or the look-up tables reflect the differences. However, the basic concept of electronic microwave-interferometry, frequency determination, and square-law detection remain the same.

The square-law detectors 18 measure $I_{ij}$'s, which are dependent on the strength of the signal received by the antenna. Therefore $I_{ij}$ can vary depending on the angles-of-arrival or the signal strength at the antennas, and it would be possible that for a given $I_{ij}$, the measurement at the square-law detectors could be due to direction-of-arrival, or signal strength, and hence an ambiguity enters as to whether the measurement yields angles-of-arrival or signal strength. To insure that an unambiguous determination is made of the angles-of-arrival, the ratios of the $I_{ij}$ are used to specify the angles-of-arrival rather than $I_{ij}$ themselves. Such ratios ($\rho_{ci}$ and $\rho_{si}$) are:

$$\rho_{c1} = \frac{I_{c12}}{I_{c13}} = d_{c1}\frac{a_{c12} + b_{c12}\cos\left(\frac{\omega}{c}\sin(\theta)[(x_1 - x_2)\cos(\phi) + (y_1 - y_2)\sin(\phi)] + \eta_{12}\right)}{a_{c13} + b_{c13}\cos\left(\frac{\omega}{c}\sin(\theta)[(x_1 - x_3)\cos(\phi) + (y_1 - y_3)\sin(\phi)] + \eta_{13}\right)} \tag{30}$$

$$\rho_{c2} = \frac{I_{c12}}{I_{c13}} = d_{c2}\frac{a_{c12} + b_{c12}\cos\left(\frac{\omega}{c}\sin(\theta)[(x_1 - x_2)\cos(\phi) + (y_1 - y_2)\sin(\phi)] + \eta_{12}\right)}{a_{c23} + b_{c23}\cos\left(\frac{\omega}{c}\sin(\theta)[(x_2 - x_3)\cos(\phi) + (y_2 - y_3)\sin(\phi)] + \eta_{23}\right)} \tag{31}$$

-continued $$p_{c3} = \frac{I_{c13}}{I_{c23}} = d_{c3} \frac{a_{c13} + b_{c13}\cos\left(\frac{\omega}{c}\sin(\theta)[(x_1 - x_3)\cos(\phi) + (y_1 - y_3)\sin(\phi)] + \eta_{13}\right)}{a_{c23} + b_{c23}\cos\left(\frac{\omega}{c}\sin(\theta)[(x_2 - x_3)\cos(\phi) + (y_2 - y_3)\sin(\phi)] + \eta_{23}\right)} \quad (32)$$

$$p_{s1} = \frac{I_{s12}}{I_{s13}} = d_{s1} \frac{a_{s12} + b_{s12}\sin\left(\frac{\omega}{c}\sin(\theta)[(x_1 - x_2)\cos(\phi) + (y_1 - y_2)\sin(\phi)] + \eta_{12}\right)}{a_{s13} + b_{s13}\sin\left(\frac{\omega}{c}\sin(\theta)[(x_1 - x_3)\cos(\phi) + (y_1 - y_3)\sin(\phi)] + \eta_{13}\right)} \quad (33)$$

$$p_{s2} = \frac{I_{s12}}{I_{s23}} = d_{s2} \frac{a_{s12} + b_{s12}\sin\left(\frac{\omega}{c}\sin(\theta)[(x_1 - x_2)\cos(\phi) + (y_1 - y_2)\sin(\phi)] + \eta_{12}\right)}{a_{s23} + b_{s23}\sin\left(\frac{\omega}{c}\sin(\theta)[(x_2 - x_3)\cos(\phi) + (y_2 - y_3)\sin(\phi)] + \eta_{23}\right)} \quad (34)$$

$$p_{s3} = \frac{I_{s13}}{I_{s23}} = d_{s3} \frac{a_{s13} + b_{s13}\sin\left(\frac{\omega}{c}\sin(\theta)[(x_1 - x_3)\cos(\phi) + (y_1 - y_3)\sin(\phi)] + \eta_{13}\right)}{a_{s23} + b_{s23}\sin\left(\frac{\omega}{c}\sin(\theta)[(x_2 - x_3)\cos(\phi) + (y_2 - y_3)\sin(\phi)] + \eta_{23}\right)} \quad (35)$$

The terms $d_{l1}$, $d_{l2}$, and $d_{l3}$ (l=s,c) are proportionality constants between the respective $I_{ij}$, and are known quantities of the electronics system. If the sum-signals are processed identically, then the d's, a's, and b's in the ratio-equations (30–35) become one.

The two sets of the foregoing three equations also represent three equations with the three unknowns which are the sine and cosine of the three arguments $\rho_{ij}$ discussed previously. Solving for the sine and cosine terms then yields the three $\rho_{ij}$ from which $\sin(\theta)$, $\sin(\phi)$, $\cos(\phi)$ are determined and the angles-of-arrival can be specified. The reciprocals of the ratios can also be used. It should be noted that the ratios $\rho_{l1}$, $\rho_{l2}$, and $\rho_{l3}$ have equality signs and not proportionality signs, and are independent of the strength of the electromagnetic signal at the antennas. As long as any other proportionality relations from the electronics used in the signal processing are known, or can be compensated during the signal processing or subsequent calculations or evaluation of the $I_{lij}$, then the angles-of-arrival identification with the ratios yields a consistent result.

Figure 6:
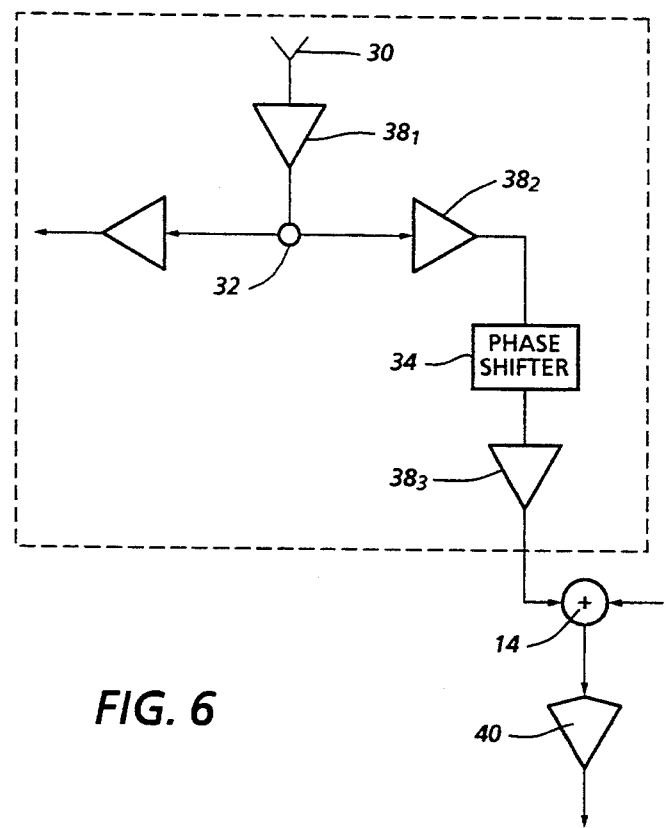
FIG. 6 is schematic diagram associated with an antenna array as an alternative to the antenna array diagrammed in FIG.2.

According to yet another embodiment of the invention as shown in FIG. 6, a method of limiting-amplification is utilized to insure accurate determination of angle-of-arrival. As shown in FIG. 6, limiting-amplifiers $38_1$, $38_2$ and $38_3$ are placed in the antenna array 12' following each antenna 30, between the signal divider 32 and phase shifter 34 and before the summer 14. FIG. 6 should not however be construed to imply that the limiting-amplifiers 38 are required at all of the locations shown at the same time. The limiting amplification of this embodiment is an electronic process that either amplifies a signal in the electronic path to a pre-specified level or reduces a signal down to that level. Also shown in FIG. 6, is a variable-amplfiier 40 to be placed following each summer 14, in which the sum-signals $S_{ij}$, or correspondingly $C_{ij}$ are amplified. In such case, the electromagnetic signal level at the antennas must be known in order to apply a specific amount of amplification or attenuation to the sum-signals so as to preserve an equivalent $\Delta\zeta$ or $\Delta\phi$ for the sum-signals regardless of the electromagnetic signal sensed by the antenna-array. In any case, signal processing for frequency-selection and square-law-detection remains as the same as hereinbefore described.

According to another method similar to the foregoing limitive amplification method, the signal strength at each antenna is determined by comparison with a reference signal strength value. Signal processing for determining the angles-of-arrival according to this computational reference method, compensates for varying signal strength by knowing the relative proportionality of the electromagnetic signal strength at the antenna to the previously specified reference for the electronic system used.

Figure 7:
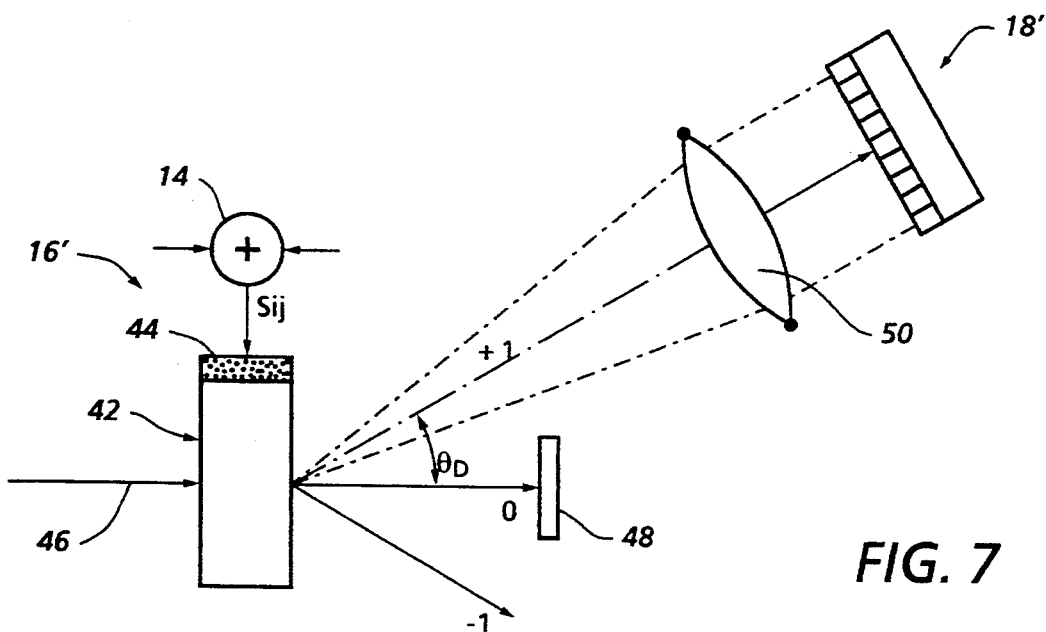
FIG. 7 is a diagram of an acoustic-optic cell type of signal processing arrangement for the surveillance system.

An embodiment of the invention using an acousto-optic and optical light arrangement, by way of example, is depicted in FIG. 7. The sum-signals $S_{ij}$ ($S_{12}$, $S_{13}$, $S_{23}$) from a summer 14, enter a frequency selecting device of the frequency separator 16 for determination of the microwave frequency of the electromagnetic signal, and to direct the signal to a square-law detector 18'. In this example, the frequency selective device is an acousto-optic cell 42 as shown in FIG. 7 while the square-law detector 18' is a light-detector array.

FIG. 7 illustrates the case where the sum signal $S_{12}$ drives the acousto-optic cell 42, having its transducer 44 connected to a summer 14. The frequency of the sound driven in the acousto-optic cell by $S_{12}$, is the frequency of the sum-signal to which the transducer 44 responds. The acousto-optic cell 42 is illuminated by a coherent and collimated beam of light 46, typically from a laser. The light enters the acousto-optic cell and interacts with the acoustic waves to be diffracted into several diffraction orders. To maximize the light that is deflected into a single diffraction order, a Bragg type of acousto-optic cell 42 may be used and the amplitude of the light's electromagnetic field in the plus or minus first order deflected light $(L_{s12}^{(\pm 1)})$, is related to $S_{12}$ so that:

$$L_{s12}^{(\pm 1)} \propto i_{s1}^{(1)} \sin\left[(\omega_L \pm \omega)t - k_{\pm}r_L \pm \frac{\omega}{c}\sin(\theta)[x_1\cos(\phi) + y_1\sin(\phi)] \pm i_{s12}^{(1)} \pm \zeta_1 + \partial_{\pm}\right] + \quad (36)$$

$$i_{s12}^{(2)} \sin\left[(\omega_L \pm \omega)t - k_{\pm}r_L \pm \frac{\omega}{c}\sin(\theta)[x_2\cos(\phi) + y_2\sin(\phi)] \pm i_{s12}^{(2)} \pm \zeta_2 + \partial_{\pm}\right]$$

The term $k_{\pm}$ is the propagation vector of the plus or minus first-order diffracted beam, $r_L$ is the position vector in the light measurement coordinate system and not the antenna coordinate system of FIG. 3, $\omega_L$ is the radial frequency of the light $$i_{s12}^{(l)} (l = 1,2)$$

are phase terms associated with propagation of the respective signals in the electronics, and $\partial_{\pm}$ is an arbitrary phase term associated with propagation of the sound in the acousto-optic cell and the light interacting with the sound and then propagating to a light-detector. The intensity of the light $(I_{12}^{(\pm 1)})$, is proportional to $(L_{12}^{(\pm 1)})$ as:

$(I_{12}^{(\pm 1)})$, is proportional to $(L_{12}^{(\pm 1)})$ as:

$$I_{s12}^{(\pm 1)} \propto <(L_{s12}^{(\pm 1)})^2> \quad (37)$$

where the symbols $<>$ indicate time averaging over an optical time period. Therefore:

$$I_{s12}^{(\pm 1)} \propto a_{s12}^{(\pm 1)} + b_{s12}^{(\pm 1)}\cos\left(\frac{\omega}{c}\sin(\theta)[(x_1 - x_2)\cos(\phi) +\right. \quad (38)$$

$$\left. (y_1 - y_2)\sin(\phi)] + i_{s12}^{(1)} - i_{s12}^{(2)} + \zeta_1 - \zeta_2\right).$$

By adjusting the phase terms, $\zeta_1$ and $\zeta_2$, expression (38) can be placed in its sine form:

$$I_{s12}^{(\pm 1)} \propto a_{s12}^{(\pm 1)} + \quad (39)$$

$$b_{s12}^{(\pm 1)}\cos\left(\frac{\omega}{c}\sin(\theta)[(x_1 - x_2)\cos(\phi) + (y_1 - y_2)\sin(\phi)] + \eta_{12}\right)$$

Hence, the intensity of the light is related to the radial frequency ($\omega$) and the angles-of-arrival ($\theta,\phi$).

Either the plus or minus deflected light can be used, and the acousto-optic cell can be oriented so that either the plus or minus order predominates in light signal. The frequency of the signal $S_{ij}$ operating the transducer 44 as shown in FIG. 7 determines the extent the laser light beam is deflected in angle $\theta_D$. It should be noted that $$i_{s12}^{(\pm 1)}$$

has the same functional relationship as $I_{s12}$ aforementioned. The term $S_{12}$ was utilized to illustrate acousto-optic signal processing. The remaining sum-signals $S_{13}$, $S_{23}$, and the $C_{ij}$ are processed in an equivalent manner. Each light measurement, $$I_{ij}^{(\pm 1)}$$

has the same functional relation as its corresponding square-law detector signal, $I_{ij}$, previously referred to.

FIG. 7 also illustrates in greater detail the frequency separator 16' through which the functions of optical detection for determining the intensity and specifying frequency are performed. For purposes of illustration only, the plus first order-diffraction is considered. The $0^{th}$-order light $$(L_{sij}^{(0)})$$

and the $1^{st}$-order light $$(L_{sij}^{(\pm 1)})$$

emerge from the acousto-optic cell 42 that is driven by the sum-signal. The 0th-order light is blocked by blocker 48 and is not used. The first order light enters a lens 50 with its focal point at the exit of the light from the acousto-optic cell 42 to direct the light perpendicular to the surface of a linear array of power detectors 18'. As the deflection angle, $\theta_D$, is varied with frequency, a single detector is illuminated. Each detector therefore corresponds to a specific frequency and hence the frequency is determined. The power of the light measured by the detector is related to the intensity of the light, which in turn is dependent on the polar-angle, azimuth-angle, and microwave frequency of the sum-signal. As previously indicated, the angles-of-arrival are determined from the measurements from all six sum-signals.

Figure 8:
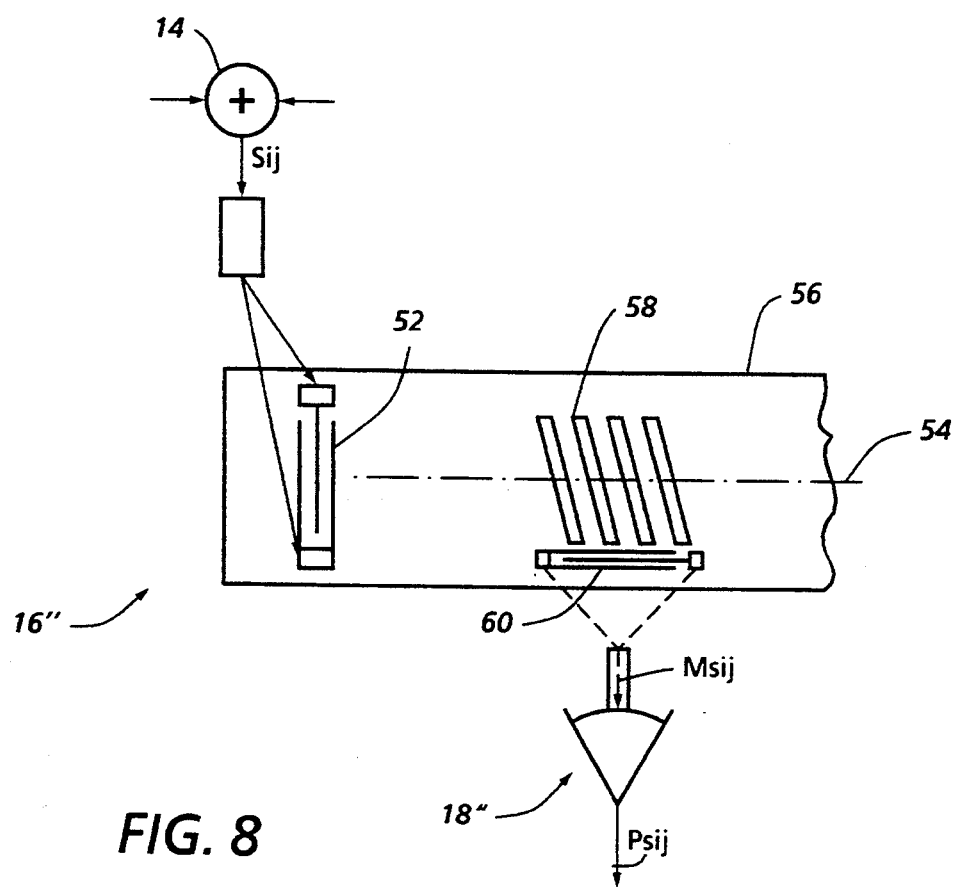
FIG. 8 is a diagram of yet another alternative material-wave type of signal processing arrangement.

An alternative approach to use of the aforementioned acousto-optic types of signal processing, pursuant to the present invention, is the use of material-wave (sound and magnetic-wave) techniques embodied in devices that do not intrinsically use light, yet act in a similar manner to that of acousto-optic cells in determining frequency and angles-of-arrival. The concept of adding the outputs of two antennas by electronic microwave-interferometry as hereinbefore explained remains the same, including the antenna arrangements and the electronics which follow and precede wave-type frequency selective devices or acousto-optic cells. The application of wave-type devices according to one surface-acoustic wave embodiment involves a reflective array type of frequency separator 16" as shown in FIG. 8, acting as a frequency discriminant that is used to determine the microwave frequency of a sum-signal from a summer 14. In the latter embodiment, $S_{ij}$ is again used as the sum-signal which drives a transducer 52 to launch an electro-acoustic (piezoelectric) signal wave 54 in the substrate of a block of material 56. As the surface-acoustic wave propagates through material 56 it will encounter reflective gratings 58 that are frequency selective, based on the spacing thereof. Such gratings 58 may be grooves etched into the surface of the substrate material 56, or metallic strips deposited on its surface. The effect of the gratings is to divert part or all of the signal denoted at 54 in FIG. 8 at a particular frequency to a receiving interdigital-transducer 60. In this manner, the frequency of the signal wave 54, and hence the frequency of sum signal $S_{ij}$ is determined. The signal is then converted by interdigital transducer 60 into an electromagnetic signal, $Ms_{ij}$, having the functional relationship:

$$M_{sij} \propto \qquad (40)$$

$$m_{sij}^{(i)}\cos\left(\omega t + \frac{\omega}{c}\sin(\theta)[x_i\cos(\phi) + y_i\sin(\phi)] + l_{ij}^{(i)} + \zeta_i + \xi\right) +$$

$$m_{sij}^{(i)}\cos\left(\omega t + \frac{\omega}{c}\sin(\theta)[x_j\cos(\phi) + y_j\sin(\phi)] + l_{ij}^{(i)} + \zeta_j + \xi\right)$$

wherein $\xi$ is an arbitrary phase term due to signal propagation through the electronic system. The signal $M_{sij}$ is propagated from the frequency separator 16″ to a square-law (power) detector 18″ and is converted by detector 18″ into a measure of its signal power, $P_{sij}$. The proportionality relationship between $P_{sij}$ and $M_{sij}$ is given by:

$$P_{sij} \propto M_{sij}^2 \qquad (41)$$

Consequently, $M_{sij}$, $P_{sij}$ has a proportionality relationship:

$$P_{sij} \propto a_{sij}^{(p)} + b_{sij}^{(p)}\cos\left(\frac{\omega}{c}\sin(\theta)[(x_i - x_j)\cos(\phi) + \right. \qquad (42)$$

$$\left. (y_i - y_j)\sin(\phi)] + l_{sij}^{(i)} - l_{sij}^{(i)} + \zeta_i - \zeta_j\right)$$

With proper choice of the phase terms (l's, $\zeta$'s), $P_{sij}$ can be placed in its sine form:

$$P_{sij} \propto a_{sij}^{(p)} + \qquad (43)$$

$$b_{sij}^{(p)}\cos\left(\frac{\omega}{c}\sin(\theta)[(x_i - x_j)\cos(\phi) + (y_i - y_j)\sin(\phi)] + \eta_{ij}\right)$$

Therefore a measurement of $P_{ij}$ provides information for the angles-of-arrival, $\theta$ and $\phi$. Thus, signal processing may be done completely within the microwave regime without resorting to photonics.

The three-antenna triangular-array hereinbefore referred to with respect to FIGS. 4 and 5, represents the minimum number of antennas for determining the angles-of-arrival, wherein the three antennas act as mutual references. Such antenna array 12 may be modified to include a fourth reference antenna. In such case, the sum-signals from summers 14 based on the same electronics, as hereinbefore pointed out, are formed in the combinations:

$$C_{01} = {}_{01}{}^{(0)}A_{\Phi 0} + {}_{01}{}^{(1)}A_{\Phi 1}$$

$$C_{02} = {}_{02}{}^{(0)}A_{\Phi 0} + {}_{02}{}^{(2)}A_{\Phi 2}$$

$$C_{23} = {}_{03}{}^{(0)}A_{\Phi 0} + {}_{03}{}^{(3)}A_{\Phi 3} \qquad (44)$$

$$S_{01} = \sigma_{01}{}^{(0)}A_{\zeta 0} + \sigma_{01}{}^{(1)}A_{\zeta 1}$$

$$S_{02} = \sigma_{02}{}^{(0)}A_{\zeta 0} + \sigma_{02}{}^{(2)}A_{\zeta 2}$$

$$S_{03} = \sigma_{03}{}^{(0)}A_{\zeta 0} + \sigma_{03}{}^{(3)}A_{\zeta 3} \qquad (45)$$

Figure 9A:
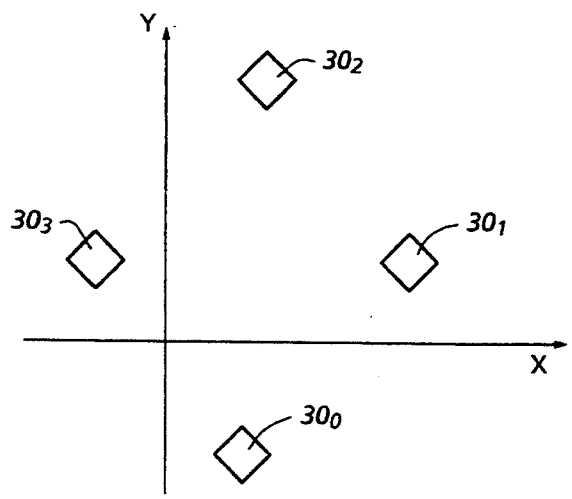
FIG. 9A illustrates a four antenna array with three comparison antennas and one reference antenna associated with the present invention.
Figure 9B:
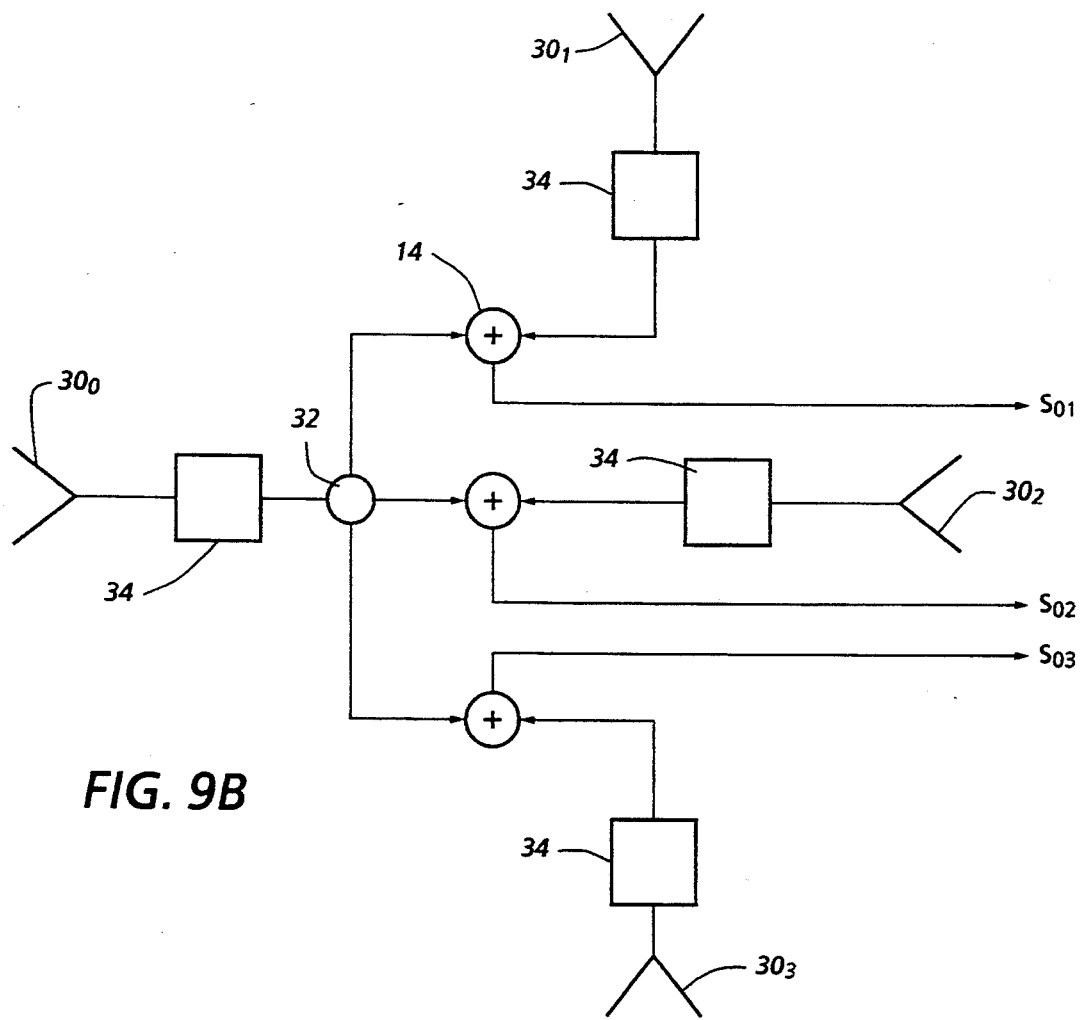
FIG. 9B is a schematic diagram showing of an embodiment of the electronic signal processing system associated with the present invention for the antenna arrangement of FIG. 9A.

FIG. 9A diagrams one configuration of microwave interferometry based on use of a reference antenna $30_0$ to provide a sum signal $S_{0j}$. As illustrated in FIG. 9B, the phase-shifted signal from the reference antenna $30_o$ is split by a divider 32 to be added to the phase-shifted signals from the other three antennas $30_1$, $30_2$ and $30_3$. If the signal processing is not identical for all six sum-signals, then proportionality, amplitude, and phase relations must be known to compensate for nonuniform signal processing. The sum-signal $S_{0j}$ (j=1,2,3) is given by:

$$S_{0j} = \qquad (46)$$

$$s_{0j}^{(i)}\cos\left(\omega t + \frac{\omega}{c}\sin(\theta)[x_0\cos(\phi) + y_0\sin(\phi)] + \beta_{s0j}^{(0)} + \zeta_0\right) +$$

$$s_{0j}^{(i)}\cos\left(\omega t + \frac{\omega}{c}\sin(\theta)[x_j\cos(\phi) + y_j\sin(\phi)] + \beta_{s0j}^{(i)} + \zeta_j\right)$$

The signal processing on the sum-signal is the same as described previously. $I_{s0j}$ is then of the form:

$$I_{s0j} \propto a_{s0j} + b_{s0j}\cos\left(\frac{\omega}{c}\sin(\theta)[x_0 - x_j)\cos(\phi) + \right. \qquad (47)$$

$$\left. (y_0 - y_j)\sin(\phi)] + l_{s0j}^{(0)} - l_{s0j}^{(i)} + \zeta_0 - \zeta_j\right)$$

Performing the same operations with the term $C_{0j}$ to find $I_{c0j}$, there is again enough information to find the three unknowns $\sin(\phi)$, $\cos(\phi)$, and $\sin(\theta)$, and specify the polar and azimuth angles.

A further embodiment of the invention utilizes orthogonal arrangements of two sets of collinear antennas. An orthogonal arrangement of two sets of collinear antennas for direction finding permit each antenna set to be sensitive to one of the trigonometric functions of the azimuth angle $\phi$ which must be determined to find the angle itself. For discussion, the x-y plane of the Cartesian coordinate system as shown in FIGS. 3A, has an x-axis parallel to one of the collinear antenna arrays and the y-axis parallel to the other. Antenna sets that are congruent or parallel to the x-axis are sensitive to phase changes associated with the x-component of the propagation vector of the electromagnetic wave impinging on the antenna array:

$$k_x = -\frac{\omega}{c}\sin(\theta)\cos(\phi) \qquad (48)$$

while the antenna sets that are congruent or parallel to the y-component of the propagation vector are sensitive to the y-component of the propagation vector:

$$k_y = -\frac{\omega}{c} \sin(\theta)\sin(\phi) \tag{49}$$

Thus each collinear antenna set specifies the corresponding cosine or sine of the azimuth angle. There are different approaches to determining the polar and azimuth angles using different antenna groupings, geometries, and method of specifying the angles based on the ratio method, and limiting/variable-amplifier or antenna-signal reference techniques.

FIG. 10 and 11 illustrate two different approaches. FIG. 10 shows the case where the orthogonal sets of collinear antennas consist of three antennas for each set of the orthogonal arrangement, and in a different and separate embodiment, FIG. 11 shows examples of the orthogonal sets of collinear antennas consist of two antennas. In these figures, the x-y plane (antenna-array plane) is aligned so that one of the orthogonal antenna sets is along each of the axes or parallel to the axes. This arrangement is for discussion purposes only. Also the orthogonal antenna-sets can be used to specify the x-y coordinate system.

FIG. 10 shows four examples a), b), c) and d) of possible antenna configurations to produce two sets of mutually orthogonal collinear arrays in which each of the collinear arrays are composed of three antenna. Examples a), b) and c) illustrate orthogonal arrays that consist of a total of five antennas, and show that the' three collinear antennas for the orthogonal array along the x-direction consist of antennas $30_0$, $30_1$, $30_2$, and along the y-direction consist of antennas $30_0$, $30_3$, $30_4$. In these embodiments of the orthogonal antenna array, antenna $30_0$ acts as a common antenna for the two orthogonal collinear arrays. The configuration shown in FIG. 10(a) uses the central antenna as a reference for the orthogonal antenna set. In FIG. 10(b), the antennas are arranged in a T shape with reference antenna $30_0$ at the junction of the x and y axes. FIG. 10(c) illustrates the antenna arranged in an L shape with the reference antenna $30_0$ at the intersection of the two arms of the L. An alternative to the five antenna approach is an orthogonal system with two independent sets of three antennas oriented perpendicular to each other as shown in FIG. 10(d), wherein the orthogonal array consists of six antennas, and the collinear antennas $30_1$, $30_2$, and $30_3$ along the x-direction while the antennas along the y-direction consist of antennas $30_4$, $30_5$, $30_6$. In FIG. 10(d), the two collinear arrays are completely independent of the other, with no common antenna. There is no particular orientation of the two sets as long as they remain perpendicular to each other. It should again be noted that the orientation of x and y coordinates in the plane of the antenna array is arbitrary, and can be defined on the basis of the orientation of the antennas. Further, the spacing between the antennas does not have to be equal.

Figure 11A:
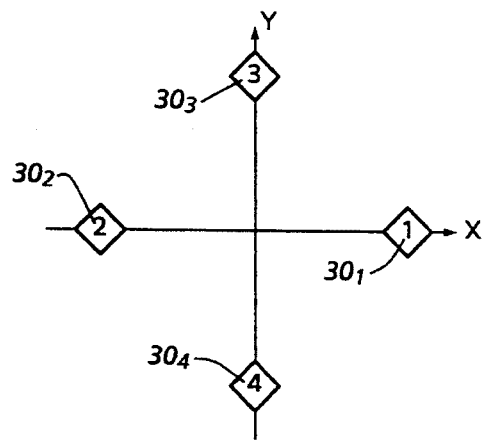
FIG. 11 shows antenna arrangements associated with the present invention utilizing two orthogonal sets of collinear antennas in which each collinear set consists of two antennas.
Figure 11B:
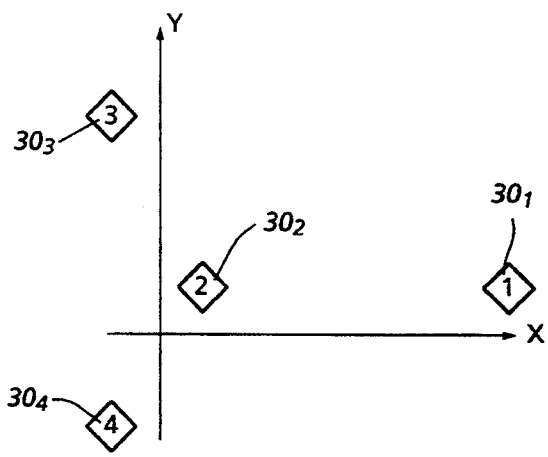
Figure 11C:
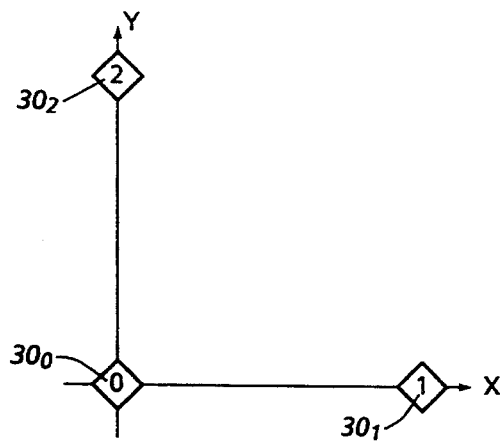

FIG. 11 shows three examples a), b) and c) of possible antenna configurations to produce two sets of mutually orthogonal collinear arrays in which each of the collinear arrays are composed of two antennas. FIG. 11(a) and FIG. 11(b) illustrate orthogonal arrays that consist of a total of four antennas with two collinear antennas $30_1$ and $30_2$ for the orthogonal array along the x-direction and antennas $30_3$, $30_4$ along the y-direction. FIG. 11(a) shows the orthogonal antenna system symmetric around the origin of the x-y plane, with equal spacing of each antenna from the origin. FIG. 11(b) has the two sets of antennas asymmetrically distributed, and mutually perpendicular. In the embodiment of FIG. 11(c), the orthogonal array consists of three antennas, with the collinear antennas for the orthogonal array in the x-direction consisting of antennas $30_0$, $30_1$, and in the y-direction antennas $30_0$, $30_1$ with antenna $30_0$ acting as a common antenna. As in the case of the three-antenna orthogonal technique, the two antenna approach can be applied to a variety of geometries.

The three antennas for each collinear array of FIG. 10 is associated with a different signal processing method than for the two antennas in each collinear array of FIG. 11.

Figure 12:
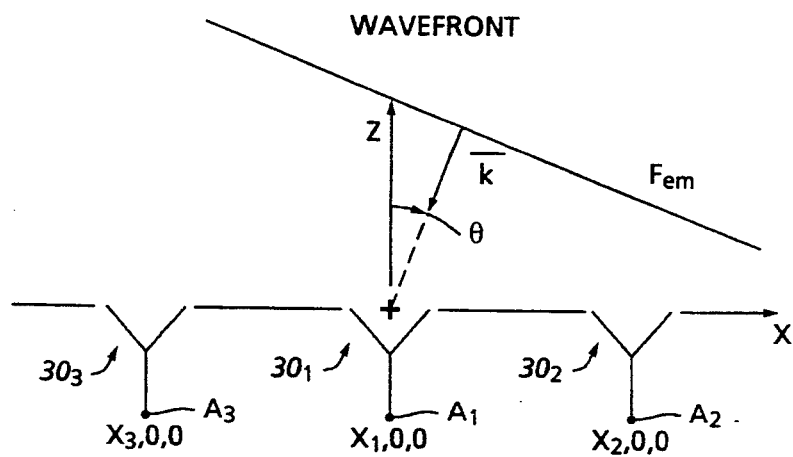
FIG. 12 is a diagram illustrating of one set three collinear antennas associated with the antenna arrays of FIG. 10.

In coordinate arrangements wherein three collinear antennas are utilized as depicted in FIG. 12, one antenna $30_1$ is located at $(x_1,0,0)$, a second antenna $30_2$ is positioned at $(x_2,0,0)$, and a third antenna $30_3$ is placed at $(x_3,0,0)$ as shown in FIG. 12. The spacing between antenna $30_1$ and the other antennas are equal or asymmetrical depending on the application. The antenna signals $A_{x1}$, $A_{x2}$, and $A_{x3}$ are similar in form to equations (7) through (9), and may be represented as:

$$A_{x1} \propto F_{em}(x = x_1, y = 0, z = 0) \propto \tag{50}$$
$$f_{em}\cos\left[\omega t + \frac{\omega}{c}\sin(\theta)[x_1\cos(\phi)] + \Psi\right]$$

$$A_{x2} \propto F_{em}(x = x_2, y = 0, z = 0) \propto \tag{51}$$
$$f_{em}\cos\left[\omega t + \frac{\omega}{c}\sin(\theta)[x_2\cos(\phi)] + \Psi\right]$$

$$A_{x3} \propto F_{em}(x = x_3, y = 0, z = 0) \propto \tag{52}$$
$$f_{em}\cos\left[\omega t + \frac{\omega}{c}\sin(\theta)[x_3\cos(\phi)] + \Psi\right]$$

Figure 13:
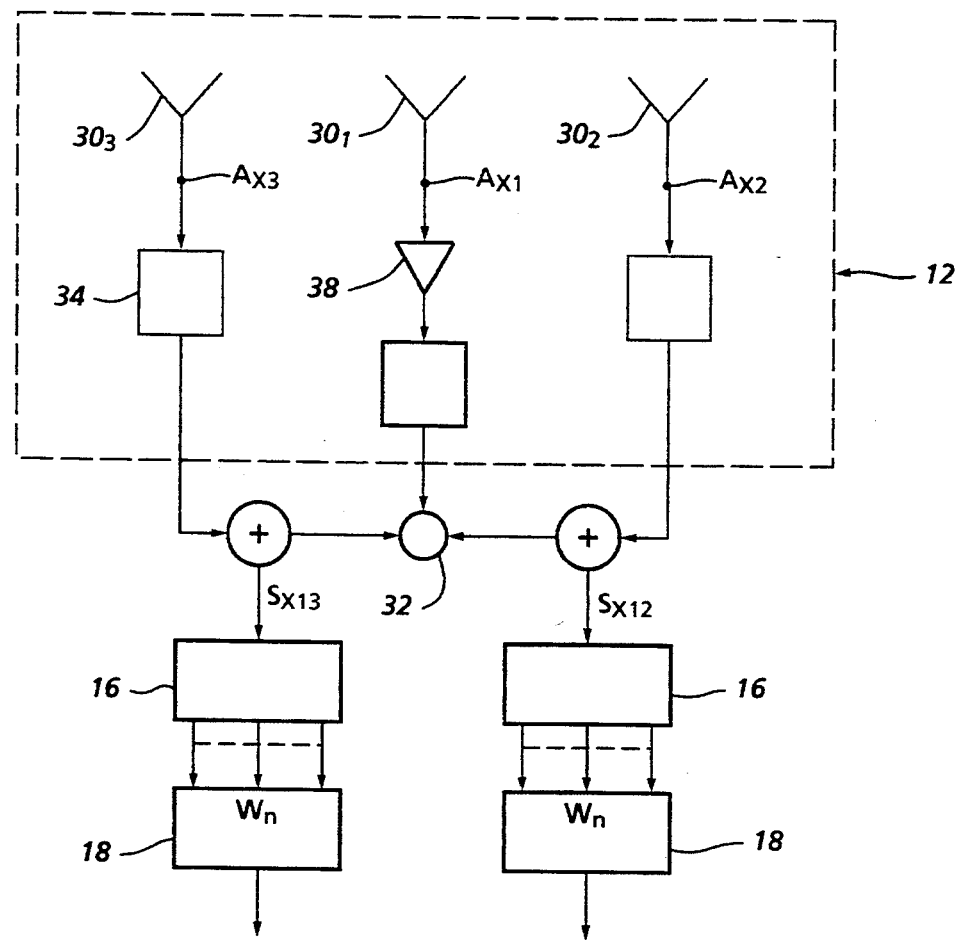
FIG. 13 illustrates a schematic diagram of a signal processing system for the three collinear antennas of FIG. 12.
Figure 14:
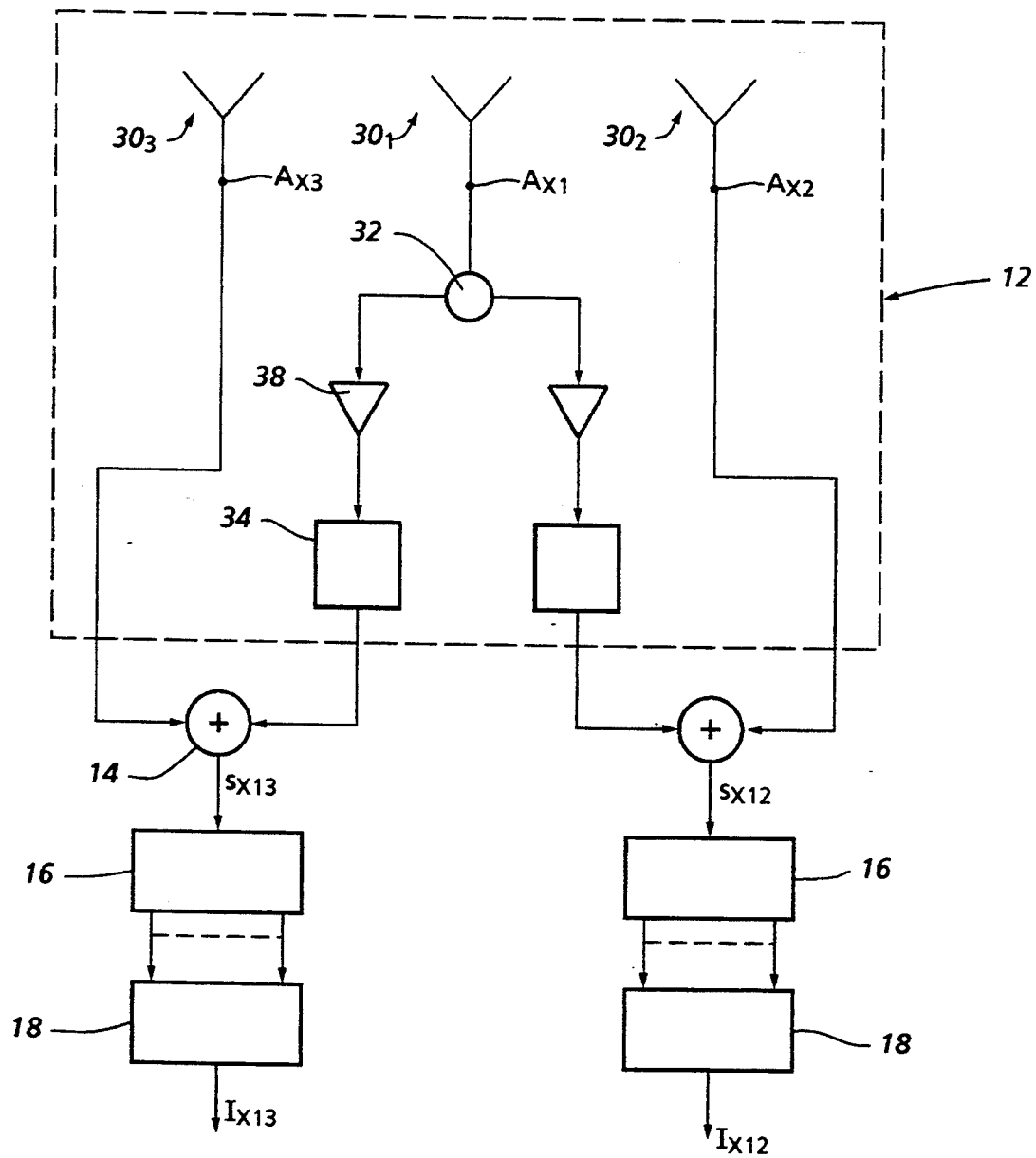
FIG. 14 is a schematic diagram of an alternative embodiment of the signal processing system for the three collinear antennas of FIG. 12.

FIG. 13 diagrams the electronics utilizing the three collinear antennas, wherein the antenna signal $A_{x1}$ is amplified by 3 dB, phased-shifted, and then equally split to combine with phased-shifted antenna signals $A_{x2}$ and $A_{x3}$ in summers 14 to produce sum-signals $S_{x12}$ and $S_{x13}$. Alternatively, $A_{x1}$ can be divided, amplified and phase-shifted as diagrammed in FIG. 14 without phase-shifting $A_{x2}$ and $A_{x3}$, and then combined with the other two antenna signals. In the latter case, antenna $30_1$ acts as a reference for antennas $30_2$ and $30_3$ in order to compare relative phase shifts caused by the angle-of-arrival. Also, other combinations of phase-shifting may be used as long as the difference in phase between the signal from the reference antenna and the other two antennas is $\pm \pi/2$ at the summers. In general, the position of the phase-shifters and amplifiers is based on the requirements of a particular system. Phase-shifting is needed in order to resolve the ambiguity of the sign of the $\cos(\phi)$ term. The sum-signals are used to drive frequency-selection devices followed by square-law detectors. FIG. 13 and FIG. 14 show both signals $S_{x12}$ and $S_{x13}$ applied to frequency-selection devices of frequency separator 16. As herein before indicated, only one of the sum-signals may be used for frequency determination, while the other can immediately be detected by the square-law detectors 18. Square-law detection produces the two signals ($I_{x12}$ and $I_{x13}$) derived from $S_{x12}$ and $S_{x13}$, respectively. These square-law detection signals are proportionally related to the frequency and angles-of-arrival and are of the form:

$$I_{x12} = a_{x12} + b_{x12}\sin\left(\frac{\omega}{c}(x_2 - x_1)\sin(\theta)\cos(\phi)\right) \quad (53)$$

$$I_{x13} = a_{x13} + b_{x13}\sin\left(\frac{\omega}{c}(x_3 - x_1)\sin(\theta)\cos(\phi)\right) \quad (54)$$

To further illustrate the foregoing, let $x_1=0$, $x_2=r_{x2}$, and $x_3=-r_{x3}$ ($r_{x2},r_{x3}>0$). Then $I_{x12}$ and $I_{x13}$ may be rewritten as:

$$I_{x12} = a_{x12} + b_{x12}\sin\left(\frac{\omega}{c} r_{x2}\sin(\theta)\cos(\phi)\right) \quad (55)$$

$$I_{x13} = a_{x13} - b_{x13}\sin\left(\frac{\omega}{c} r_{x3}\sin(\theta)\cos(\phi)\right) \quad (56)$$

Taking the ratio of $I_{x12}$ to $I_{x13}$, results in: Similar signal processing and results are found for the antennas parallel to the y-direction, and a ratio equation like that of $\rho_x$ is found for the y-direction, except that $\cos(\phi)$ is replaced by $\sin(\phi)$:

$$\rho_x = \frac{I_{x12}}{I_{x13}} = d_x \frac{1 + \Delta_{x12}\sin\left(\frac{\omega r_{x2}}{c}\sin(\theta)\cos(\phi)\right)}{1 - \Delta_{x13}\sin\left(\frac{\omega r_{x3}}{c}\sin(\theta)\cos(\phi)\right)} \quad (57)$$

$$\rho_y = \frac{I_{y12}}{I_{y13}} = d_y \frac{1 + \Delta_{y12}\sin\left(\frac{\omega r_{y2}}{c}\sin(\theta)\cos(\phi)\right)}{1 - \Delta_{y13}\sin\left(\frac{\omega r_{y3}}{c}\sin(\theta)\cos(\phi)\right)} \quad (58)$$

The ratios $\rho_x$ and $\rho_y$ are used to determine the angles-of-arrival from computational techniques or look-up tables. The ratios may be used to directly determine in which quadrant the azimuth-angle $\phi$ is found. If $\cos(\phi)$ is positive, then $\rho_x$ is always larger than $d_x$. If $\cos(\phi)$ is negative, then $\rho_x$ is always less than $d_x$. Correspondingly, if $\sin(\phi)$ is positive then $\rho_y$ is always larger than $d_y$, and if $\sin(\phi)$ is negative then $\rho_y$ is always less than $d_y$. Thus, from the sign of the cosine and sine terms, the quadrant of $\phi$ is known. If $r_{x2}=r_{x3}=r_x$ and $r_{y2}=r_{y3}=r_y$, then the ratio equations (57) and (58) together are solved exactly for $\theta$ and $\phi$. Separating the angle dependencies from the rest of the terms:

$$\sin(\theta)\cos(\phi) = \frac{c}{\omega r_x}\left(\sin^{-1}\left[\frac{\rho_x - d_x}{\rho_x \Delta_{x13} + d_x \Delta_{x12}}\right]\right) \quad (59)$$

$$\sin(\theta)\cos(\phi) = \frac{c}{\omega r_y}\left(\sin^{-1}\left[\frac{\rho_y - d_y}{\rho_y \Delta_{y13} + d_y \Delta_{y12}}\right]\right) \quad (60)$$

Dividing the latter two equations, one can find the $\tan(\phi)$, from which the magnitude of $\phi$ is determined:

$$\phi = \tan^{-1}\left\{\frac{r_y \sin^{-1}\left[\frac{\rho_y - d_y}{\rho_y \Delta_{y13} + d_y \Delta_{y12}}\right]}{r_x \sin^{-1}\left[\frac{\rho_x - d_x}{\rho_x \Delta_{x13} + d_x \Delta_{x12}}\right]}\right\} \quad (61)$$

With $\phi$ determined, $\theta$ is found from either equation (59) or (60).

As indicated previously, the phase-shifters 34 are placed in the signal paths of the antenna signals for control of the phase of the signals entering the summers 14 so that the signal from the reference antennas has a $\pm \pi/2$ phase difference with each of the other two antenna signals prior to the respective summers. Without the phase-shifters, the square-law detector output is of the form:

$$I_{ylj} = a_{ylj} + b_{ylj}\cos\left(\frac{\omega}{c} r_{yj}\sin(\theta)\cos(\phi)\right) \quad (62)$$

$$I_{xlj} = a_{xlj} + b_{xlj}\cos\left(\frac{\omega}{c} r_{xj}\sin(\theta)\cos(\phi)\right), \quad (63)$$

wherein a cosine appears in the above equations outside of the large parentheses, in contrast to the sine term outside of the parentheses that appear in equations (55) and (56). With this cosine term, an ambiguity exists in determining the quadrant ($\phi$), since the cosine term makes $I_{xlj}$ and correspondingly $I_{ylj}$, insensitive to the sign of the $\cos(\phi)$ and $\sin(\phi)$ terms, respectively, because the cosine term gives the same results for $I_{xlj}$ and $I_{ylj}$ regardless of the sign of the $\cos(\phi)$ and $\sin(\phi)$. Thus the phase-shifters are introduced to remove this degeneracy, and convert the cosine term in equations (62) and (63) to the sine term in equations (55) and (56). Regardless of the orthogonal orientation scheme, the same basic method of determining the angles-of-arrival and frequency applies. It should again be noted, that the orientation of x and y coordinates in the plane of the antenna array is arbitrary, and can be defined on the basis of the orientation of the antennas. Further, the spacing between the antennas does not have to be equal.

Figure 10A:
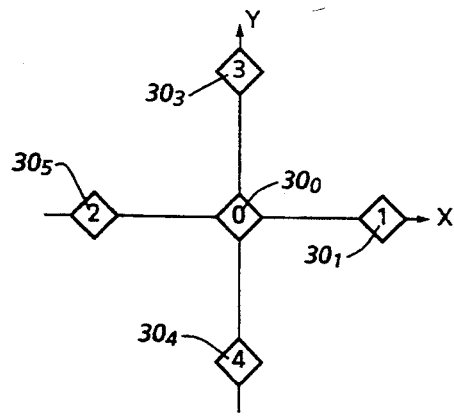
FIG. 10 shows antenna arrangements associated with the present invention utilizing two orthogonal sets of collinear antennas in which each collinear set consists of three antennas.
Figure 10B:
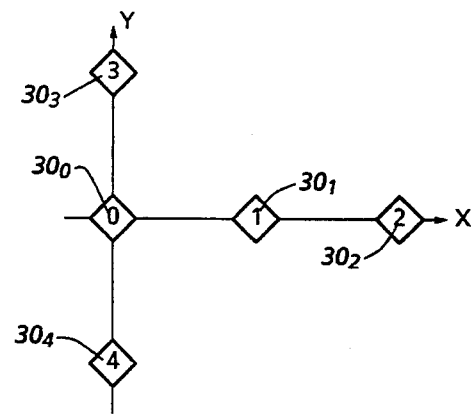
Figure 10C:
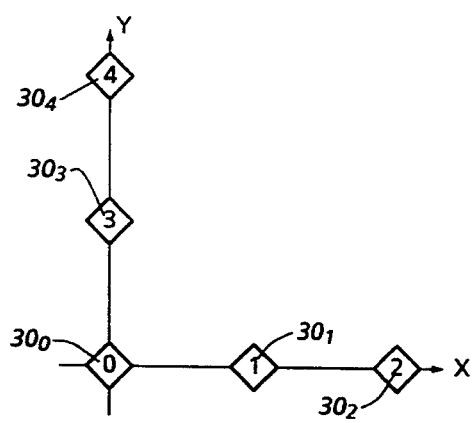
Figure 10D:
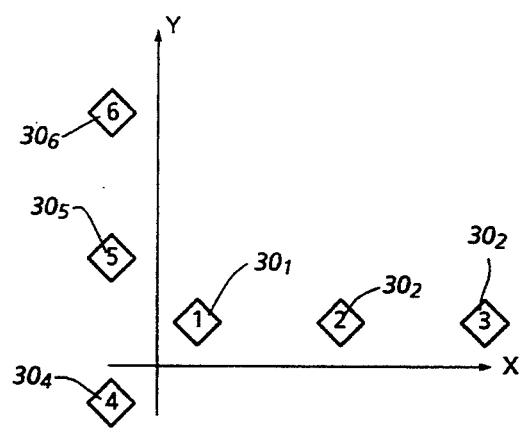

Another example of signal processing electronics, is presented in FIG. 15, wherein a five antenna array is used (FIG. 10A, FIG. 10B, FIG. 10C). The center common $30_0$ acts as a reference for the two sets of orthogonally oriented antennas. One set of antennas $30_1$ and $30_2$ are oriented along the x-axis, while the other set of antennas $30_3$ and $30_4$ are aligned along the y-axis. The signal from the center antenna $30_0$ is amplified by a factor equal to the number of other antennas and then split into equal signals to be added to each of the signals from the other antennas which have been phase shifted by $-\pi/2$. The resultant signals are $S_{x0j}$ and $S_{y0l}$. Following the summers 14, the sum-signals are processed as previously pointed out.

In the three-collinear orthogonal array, three antennas per arm of the array are utilized and a ratio-method is utilized for determining the angles-of-arrival. Yet another approach is to use two antennas instead of three, in each arm of the orthogonal array, as depicted in FIG. 11 and utilize the limiting/variable-amplification approach, or equivalently, comparison to a fixed reference to which measurements and computations are normalized. Each arm of the array is independently sensitive to the x or y component of the propagation vector as aforementioned. FIG. 16 shows two antennas $30_1$ and $30_2$ wherein one antenna is positioned along the x-axis at $x=x_1$, $y=0$, $z=0$, and the other antenna is also positioned along the x-axis at coordinates $x=x_2$, $y=0$, $z=0$. The antennas are separated by a distance $r_x$ and the antenna signals $A_{x1}$ and $A_{x2}$ received are represented by equations (50) and (51) respectively. Such signals from the antennas are then inserted into an electronic system as diagrammed in FIG. 17A, wherein a phase-shifter 34 is inserted after antenna $30_2$ thereby changing the phase of $A_{x2}$. The phase-shifter is needed in order to resolve the ambiguity, present in a one dimensional array, as to sign of the $\cos(\phi)$ term. The antenna signals are added together at the summer 14 to produce the sum-signal $S_{x12}$. A variable-amplifier 40 is placed after the summer. The limited signal is then directed to a frequency-selector 16 and square law detectors 18. An alternative arrangement is shown in FIG. 7B wherein two limiting-amplifiers 38 are provided. Limiting-amplifier $38_1$ acts on antenna signal $A_{x1}$ prior to summer 14, and limiting-amplifier $38_2$ acts on the phased-shifted signal of $A_{x2}$ after phase-shifter 34 and before summer 14. FIG. 17B also shown the limiting-amplifier $38_2$ placed before the phase-shifter 34 instead of after the phase-shifter 34. Regardless of where the limiting-amplifier 382 is placed before summer 14, the two limited signals from each antenna, are added together at the summer 14 to produce sum-signal $S_{x12}$. Sum-signal $S_{x12}$ is then directed to frequency selector 16 and square law detectors 18. According to FIG. 17B the antenna signals are passed through limiting amplifiers 38 before the summer 14.

The output from the square-law detectors is again of the form:

$$I_{x12} = a_{x12} + b_{x12}\sin\left(\frac{\omega}{c}(x_2 - x_1)\sin(\theta)\cos(\phi)\right) \quad (64)$$

A corresponding expression is found for the y-axis antenna set:

$$I_{y34} = a_{y34} + b_{y34}\sin\left(\frac{\omega}{c}(y_4 - y_3)\sin(\theta)\sin(\phi)\right) \quad (65)$$

Again, one finds that $I_{x12}$ and $I_{y34}$ are sensitive to the signal of the $\cos(\phi)$ and $\sin(\phi)$ respectively, and hence the quadrant in which $\phi$ is located is specified either by direct computation or from increasing or decreasing changes of the value of $I_{x12}$ or $I_{y34}$ from $a_{x12}$ or $a_{y34}$, respectively. There is now sufficient information, with the known quantities, to solve for $\sin(\theta)\cos(\phi)$ and $\sin(\theta)\sin(\phi)$ form the two previous equations:

$$\sin(\theta)\cos(\phi) = \frac{c}{\omega(x_2 - x_1)} \sin^{-1}\left(\frac{I_{x12} - a_{x12}}{b_{x12}}\right) \quad (66)$$

$$\sin(\theta)\sin(\phi) = \frac{c}{\omega(y_4 - y_3)} \sin^{-1}\left(\frac{I_{x34} - a_{y34}}{b_{y34}}\right) \quad (67)$$

The azimuth angle can be found from the $\tan(\phi)$ and quadrant information:

$$\phi = \tan^{-1}\left\{\frac{(y_4 - y_3)\sin^{-1}\left(\frac{I_{y34} - a_{y34}}{b_{y34}}\right)}{(x_2 - x_1)\sin^{-1}\left(\frac{I_{x12} - a_{x12}}{b_{x12}}\right)}\right\} \quad (68)$$

and then $\theta$ can be determined using either equation (66) or equation (67). As an alternative to the computational means, a look-up table procedure can also be implemented.

Obviously, numerous other modifications and variations of the present invention are possible in light of the foregoing teachings. It is therefore to be understood that within the scope of the appended claims the invention may be practiced otherwise than as specifically described.

What is claimed is:

1. In a signal surveillance system having antennas arranged in an array to simultaneously detect radiation of incoming signals at different angles of arrival within a predetermined frequency range, signal summing means operatively connected to a pair of the antennas for electronically adding signal outputs therefrom having different phases respectively corresponding to the different angles of arrival of the simultaneously detected incoming signals at different common frequencies within said predetermined frequency range; frequency separator means operatively connected to the summing means for selectively dividing the added signal outputs into different frequency components respectively corresponding to said different angles of arrival of the incoming signals simultaneously detected at each of the common frequencies; and analyzer means electronically processing the different frequency components from the frequency separator means for simultaneously determining therefrom the common frequencies and different phases of the incoming signals respectively corresponding to the different angles of arrival at each of said common frequencies.

2. The signal surveillance system as defined in claim 1, wherein said analyzer means includes square law detector means connected to the frequency separator means for respectively measuring power levels of the frequency components of the added signal outputs; and comparator means connected to the square law detector means for comparing the measured power levels to determine the phase differences.

3. The signal surveillance system as defined in claim 2, including signal dividing means operatively interconnecting different pairs of the antennas in the array with the summing means.

4. The signal surveillance system as defined in claim 3, wherein said array of the antennas further includes a signal phase shifter interconnected between at least one of the antennas and the summing means.

5. The combination of claim 4 wherein said antenna array still further includes a signal limiting amplifier operatively interconnected between at least one of the antennas and the summing means.

6. The combination of claim 1 including a variable amplifier interconnected between the summing means and the frequency separator means.

7. In a method of determining direction and frequency of incoming signals radiated to an array of antennas, the steps of: adding signal outputs of the antennas of the array receiving said incoming signals simultaneously at different angles of arrival; electronically separating the added signal outputs according to different frequencies of the incoming signals at the different angles of arrival simultaneously received by said antennas; measuring power levels of the added signal outputs electronically separated according to the respectively different frequencies of the incoming signals received by said antennas; and comparing the measured power levels at each of said different frequencies to determine phase differences between the incoming signals simultaneously received by said antennas at the respectively different angles of arrival.

8. The method as defined in claim 7 wherein said step of adding the signal outputs of the antennas, includes: transmitting each of the signal outputs along divided signal paths; and simultaneously adding the signal outputs from at least three of the antennas transmitted along three pairs of said divided signal paths.

9. A system for determining frequency and direction of arrival of incoming signals to an array of antennas, comprising: means for summing the incoming signals simultaneously received by the antennas at different angles of arrival into electronic signal outputs; electronic processing means coupled to the summing means for selectively dividing each of said electronic signal outputs into different frequency components; and means for measuring amplitude of said frequency components of the electronic signal outputs reflecting phase differences therebetween; whereby the frequency, positions of the antennas at which the incoming signals are simultaneously received at the different angles of arrival and the direction of arrival of the incoming signals at said antennas are related to said phase differences from which the frequency and the direction of arrival of the incoming signals are determined.

* * * * *